United States Patent
Igarashi et al.

(10) Patent No.: US 7,218,788 B2
(45) Date of Patent: May 15, 2007

(54) IMAGE CODER/DECODER, IMAGE CODING/DECODING METHOD, AND STORAGE MEDIUM

(75) Inventors: Susumu Igarashi, Kanagawa (JP); Tetsuya Tateno, Kanagawa (JP); Makoto Satoh, Tokyo (JP); Yukio Chiba, Kanagawa (JP); Katsumi Otsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 563 days.

(21) Appl. No.: 10/073,112

(22) Filed: Feb. 12, 2002

(65) Prior Publication Data
US 2002/0122599 A1 Sep. 5, 2002

(30) Foreign Application Priority Data
Feb. 13, 2001 (JP) ............................. 2001-036095
Jan. 22, 2002 (JP) ............................. 2002-013524

(51) Int. Cl.
*G06K 9/36* (2006.01)
*G06K 9/46* (2006.01)

(52) U.S. Cl. ...................... 382/239; 382/248; 382/251

(58) Field of Classification Search ................ 382/236, 382/238, 239, 248, 251; 341/67
See application file for complete search history.

(56) References Cited

U.S. PATENT DOCUMENTS

| | | | |
|---|---|---|---|
| 5,121,216 A * | 6/1992 | Chen et al. ................. | 382/239 |
| 5,432,556 A * | 7/1995 | Hatano et al. ......... | 375/240.12 |
| 5,751,233 A | 5/1998 | Tateno et al. ................. | 341/67 |
| 5,761,345 A * | 6/1998 | Saito et al. ................. | 382/246 |
| 5,838,834 A | 11/1998 | Saito ........................ | 382/25.1 |
| 5,848,194 A | 12/1998 | Ishizuka et al. ............ | 382/234 |
| 6,313,767 B1 | 11/2001 | Ishizuka et al. .............. | 341/67 |
| 6,608,936 B2 * | 8/2003 | Boon ........................ | 382/233 |

FOREIGN PATENT DOCUMENTS

JP 06-054196 2/1994
JP 08-195954 7/1996

* cited by examiner

*Primary Examiner*—Duy M. Dang
(74) *Attorney, Agent, or Firm*—Fitzpatrick, Cella, Harper & Scinto

(57) ABSTRACT

In image data coding and decoding processing, in order to improve efficiency by processing a plurality of factors in one cycle as long as possible, the factors are rearranged, in coding or decoding processing, in a predetermined scan sequence such that significant factors and 0s are paired. In addition, an appropriate scan sequence is selected in accordance with the distribution state of frequencies to further improve the efficiency.

3 Claims, 22 Drawing Sheets

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 2A

| 1 | 3 | 11 | 13 | 29 | 31 | 55 | 57 |
|---|---|---|---|---|---|---|---|
| 5 | 9 | 15 | 27 | 33 | 53 | 59 | 44 |
| 7 | 17 | 25 | 35 | 51 | 61 | 46 | 42 |
| 19 | 23 | 37 | 49 | 63 | 48 | 40 | 22 |
| 21 | 39 | 47 | 64 | 50 | 38 | 24 | 20 |
| 41 | 45 | 62 | 52 | 36 | 26 | 18 | 8 |
| 43 | 60 | 54 | 34 | 28 | 16 | 10 | 6 |
| 58 | 56 | 32 | 30 | 14 | 12 | 4 | 2 |

FIG. 2B

| 1 | 3 | 5 | 7 | 9 | 11 | 13 | 15 |
|---|---|---|---|---|---|---|---|
| 17 | 19 | 21 | 23 | 25 | 27 | 29 | 31 |
| 33 | 35 | 37 | 39 | 41 | 43 | 45 | 47 |
| 49 | 51 | 53 | 55 | 57 | 59 | 61 | 63 |
| 50 | 52 | 54 | 56 | 58 | 60 | 62 | 64 |
| 34 | 36 | 38 | 40 | 42 | 44 | 46 | 48 |
| 18 | 20 | 22 | 24 | 26 | 28 | 30 | 32 |
| 2 | 4 | 6 | 8 | 10 | 12 | 14 | 16 |

FIG. 2C

| 1 | 17 | 33 | 49 | 50 | 34 | 18 | 2 |
|---|---|---|---|---|---|---|---|
| 3 | 19 | 35 | 51 | 52 | 36 | 20 | 4 |
| 5 | 21 | 37 | 53 | 54 | 38 | 22 | 6 |
| 7 | 23 | 39 | 55 | 56 | 40 | 24 | 8 |
| 9 | 25 | 41 | 57 | 58 | 42 | 26 | 10 |
| 11 | 27 | 43 | 59 | 60 | 44 | 28 | 12 |
| 13 | 29 | 45 | 61 | 62 | 46 | 30 | 14 |
| 15 | 31 | 47 | 63 | 64 | 48 | 32 | 16 |

FIG. 2D

| 1 | 9 | 17 | 25 | 33 | 41 | 49 | 57 |
|---|---|---|---|---|---|---|---|
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |
| 8 | 16 | 24 | 32 | 40 | 48 | 56 | 64 |

FIG. 2E

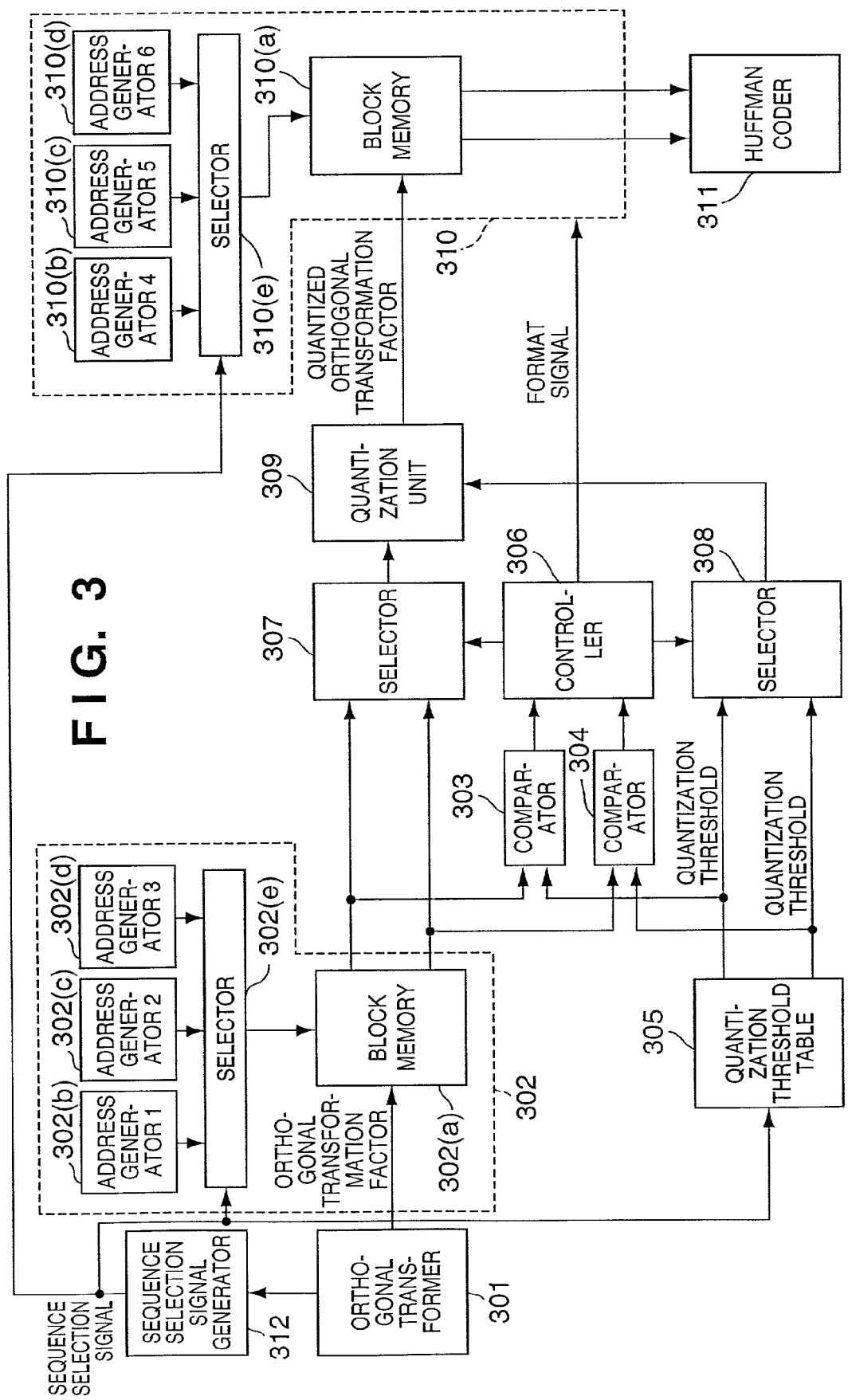

|   |   |   |   |   |   |   |   |
|---|---|---|---|---|---|---|---|
| S | S | S | S | 0 | S | 0 | 0 |
| S | S | S | S | 0 | S | 0 | 0 |
| S | S | S | 0 | S | 0 | 0 | 0 |
| S | 0 | S | S | 0 | 0 | 0 | 0 |
| 0 | 0 | 0 | 0 | 0 | 0 | 0 | 0 |
| 0 | 0 | 0 | 0 | 0 | S | 0 | 0 |
| 0 | 0 | S | 0 | 0 | 0 | 0 | 0 |
| 0 | 0 | 0 | 0 | 0 | 0 | 0 | 0 |

|   |   |   |   |   |   |   |   |
|---|---|---|---|---|---|---|---|
| S | S | S | S | 0 | S | 0 | 0 |
| S | S | S | S | S | 0 | S | S |
| S | S | S | 0 | 0 | 0 | 0 | 0 |
| 0 | S | 0 | S | 0 | 0 | 0 | 0 |
| 0 | 0 | 0 | 0 | S | 0 | 0 | 0 |
| 0 | 0 | 0 | 0 | 0 | 0 | 0 | 0 |
| S | 0 | 0 | 0 | 0 | 0 | 0 | 0 |
| 0 | 0 | 0 | 0 | 0 | 0 | 0 | 0 |

| S | S | S | 0 | 0 | 0 | S | 0 |
|---|---|---|---|---|---|---|---|
| S | S | S | S | 0 | 0 | 0 | 0 |
| S | S | S | 0 | 0 | 0 | 0 | 0 |
| S | S | 0 | S | 0 | 0 | 0 | 0 |
| 0 | S | 0 | 0 | S | 0 | 0 | 0 |
| S | 0 | 0 | 0 | 0 | 0 | 0 | 0 |
| 0 | S | 0 | 0 | 0 | 0 | 0 | 0 |
| 0 | S | 0 | 0 | 0 | 0 | 0 | 0 |

F I G. 6A (S,S)(S,S)(S,S)(0,S)(S,S)(0,S)(S,S)(0,0)(0,0)(0,S)(S,0)(0,0)(S,0)(0,S)(0,0)(0,0)
(0,0)(S,0)(S,0)(0,S)(0,0)(0,0)(0,0)(0,0)(0,0)(0,0)(0,0)(0,0)(0,0)(0,0)(0,0)(0,0)

F I G. 6B (S,0)(S,0)(S,0)(S,0)(S,0)(S,0)(0,0)(S,0)(S,0)(S,0)(0,0)(S,0)(S,0)(S,0)(0,0)(0,0)
(0,0)(0,0)(0,0)(S,0)(S,0)(0,0)(0,0)(0,0)(S,S)(0,0)(0,0)(S,S)(0,0)(0,S)(0,0)(0,0)

F I G. 6C (S,0)(S,S)(S,0)(0,0)(0,0)(0,0)(S,0)(0,0)(S,0)(S,S)(S,0)(S,0)(0,0)(0,0)(0,0)(0,0)
(S,S)(S,0)(S,0)(0,0)(0,0)(0,0)(0,0)(0,0)(S,0)(S,S)(0,0)(S,0)(0,S)(0,0)(0,0)(0,0)

F I G. 6D (S,0)(S,0)(S,0)(S,0)(0,0)(S,0)(0,0)(0,0)(S,S)(S,0)(S,0)(S,0)(S,0)(0,0)(S,0)(S,0)
(S,0)(S,0)(S,0)(0,0)(0,0)(0,0)(0,0)(0,0)(0,0)(S,0)(0,0)(S,0)(0,S)(0,0)(0,0)(0,0)

F I G. 6E

| S | S | S | S | S | S | 0 | 0 |
|---|---|---|---|---|---|---|---|
| S | S | S | S | 0 | S | 0 | 0 |
| S | S | S | 0 | S | 0 | 0 | 0 |
| S | 0 | S | S | 0 | 0 | 0 | 0 |
| 0 | 0 | 0 | 0 | 0 | 0 | 0 | 0 |
| 0 | 0 | 0 | 0 | 0 | S | 0 | 0 |
| 0 | 0 | S | 0 | 0 | 0 | 0 | 0 |
| 0 | 0 | 0 | 0 | 0 | 0 | 0 | 0 |

F I G. 9A

(S,S)(S,S)(S,S)(S,S)(S,S)(0,0)(S,S)(S,S)(0,0)(S,0)(0,0)(0,0)(S,S)(S,0)(0,0)(0,0)
(0,0)(0,0)(0,S)(0,0)(0,0)(0,0)(0,0)(0,0)(0,0)(0,S)(0,0)(0,0)(0,0)(0,0)(0,0)(0,0)

F I G. 9B

(S,0)(S,0)(S,0)(S,0)(S,0)(S,0)(S,0)(S,0)(S,0)(S,0)(0,0)(0,0)(S,S)(S,0)(S,0)(S,0)
(0,0)(0,0)(S,0)(0,0)(0,0)(0,0)(0,0)(0,0)(S,0)(S,0)(S,S)(0,0)(0,0)(0,0)(0,0)(0,0)

F I G. 9C

(S,0)(S,0)(S,0)(S,0)(S,0)(S,0)(0,0)(0,0)(S,0)(S,0)(S,S)(S,0)(0,0)(S,0)(0,0)(0,0)
(S,0)(S,0)(S,0)(0,0)(S,0)(0,S)(0,0)(0,0)(S,0)(0,0)(S,0)(S,0)(0,0)(0,0)(0,0)(0,0)

F I G. 9D

(S,0)(S,0)(S,0)(S,0)(0,0)(0,0)(0,0)(0,0)(S,0)(S,0)(S,0)(0,0)(0,0)(0,0)(0,0)(0,0)
(S,S)(S,S)(S,0)(S,0)(0,0)(0,S)(S,0)(0,0)(S,S)(S,0)(0,S)(S,0)(0,0)(0,0)(0,0)(0,0)

F I G. 9E

(S,S)(S,S)(0,0)(0,0)(S,S)(S,0)(0,0)(0,0)(S,S)(S,S)(0,0)(S,0)(S,S)(0,S)(0,0)(0,0)
(S,0)(S,0)(0,0)(0,0)(S,S)(0,0)(0,S)(0,0)(0,0)(0,0)(0,0)(0,0)(0,0)(0,0)(0,0)(0,0)

F I G. 9F

|   |   |   |   |   |   |   |   |
|---|---|---|---|---|---|---|---|
| S | S | S | S | S | S | 0 | 0 |
| S | S | S | S | S | 0 | S | S |
| S | S | S | 0 | 0 | 0 | 0 | 0 |
| 0 | S | 0 | S | 0 | 0 | 0 | 0 |
| 0 | 0 | 0 | 0 | S | 0 | 0 | 0 |
| 0 | 0 | 0 | 0 | 0 | 0 | 0 | 0 |
| S | 0 | 0 | 0 | 0 | 0 | 0 | 0 |
| 0 | 0 | 0 | 0 | 0 | 0 | 0 | 0 |

| S | S | S | 0 | S | 0 | S | 0 |
|---|---|---|---|---|---|---|---|
| S | S | S | S | 0 | 0 | 0 | 0 |
| S | S | S | 0 | 0 | 0 | 0 | 0 |
| S | S | 0 | S | 0 | 0 | 0 | 0 |
| 0 | S | 0 | 0 | S | 0 | 0 | 0 |
| S | 0 | 0 | 0 | 0 | 0 | 0 | 0 |
| 0 | S | 0 | 0 | 0 | 0 | 0 | 0 |
| 0 | S | 0 | 0 | 0 | 0 | 0 | 0 |

F I G. 12B
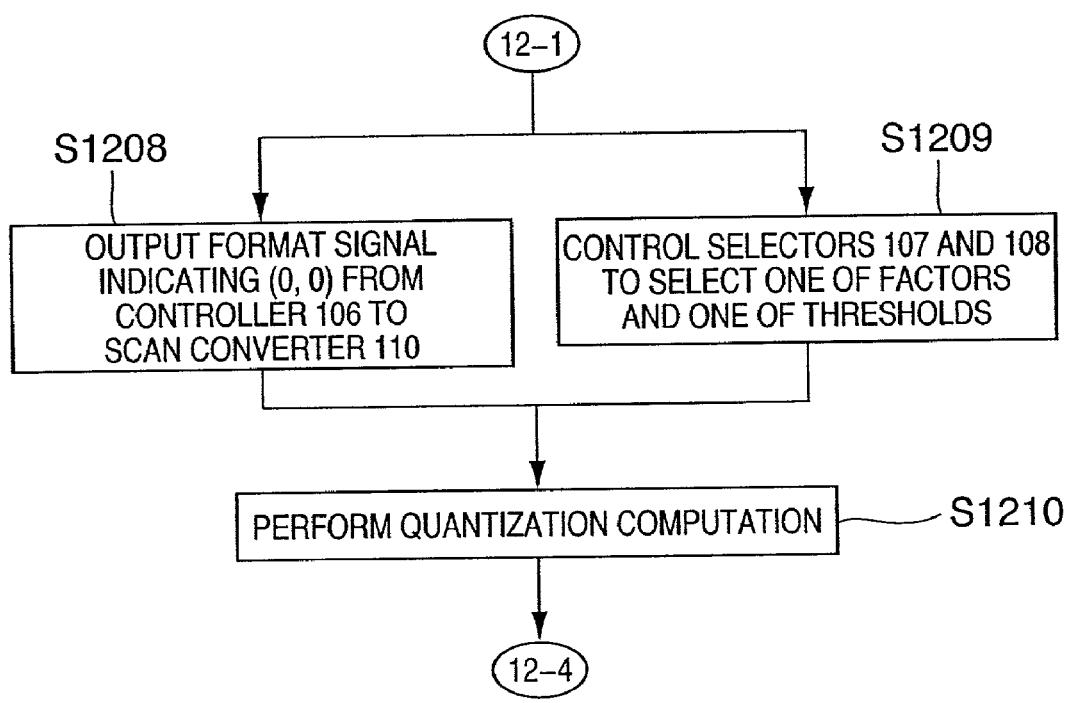

| S | S | S | S | 0 | 0 | 0 | 0 |
|---|---|---|---|---|---|---|---|
| S | S | S | S | S | S | 0 | 0 |
| S | S | S | 0 | S | 0 | 0 | 0 |
| S | 0 | S | S | 0 | 0 | 0 | 0 |
| S | S | 0 | 0 | S | 0 | 0 | 0 |
| 0 | 0 | 0 | S | 0 | 0 | 0 | 0 |
| 0 | 0 | S | 0 | 0 | 0 | 0 | 0 |
| 0 | 0 | 0 | 0 | 0 | 0 | 0 | 0 |

F I G. 14A

(S,S)(S,S)(S,S)(S,S)(S,S)(S,0)(S,S)(0,0)(S,0)(S,S)(0,0)(0,0)(S,S)(S,0)(0,0)(0,0)
(0,0)(0,0)(0,S)(S,S)(0,0)(0,0)(0,0)(0,0)(0,0)(0,0)(0,0)(0,0)(0,0)(0,0)(0,0)(0,0)

F I G. 14B

(S,S)(S,S)(S,0)(0,0)(S,S)(S,0)(S,0)(0,0)(S,S)(S,S)(0,0)(S,0)(S,S)(0,S)(0,S)(0,0)
(0,S)(S,0)(S,0)(0,0)(0,S)(0,0)(0,0)(0,0)(0,0)(0,0)(0,0)(0,0)(0,0)(0,0)(0,0)(0,0)

F I G. 14C

| S | S | S | 0 | S | 0 | 0 | 0 |
|---|---|---|---|---|---|---|---|
| S | S | S | S | 0 | S | 0 | 0 |
| S | S | S | 0 | S | 0 | 0 | 0 |
| S | S | 0 | S | 0 | 0 | 0 | 0 |
| S | 0 | S | S | S | 0 | 0 | 0 |
| 0 | S | 0 | 0 | 0 | 0 | 0 | 0 |
| 0 | 0 | S | 0 | 0 | 0 | 0 | 0 |
| 0 | 0 | 0 | 0 | 0 | 0 | 0 | 0 |

|   |   |   |   |   |   |   |   |
|---|---|---|---|---|---|---|---|
| S | S | S | S | 0 | S | 0 | 0 |
| S | S | S | 0 | S | 0 | 0 | 0 |
| S | S | S | S | 0 | S | 0 | 0 |
| 0 | 0 | S | 0 | S | 0 | 0 | 0 |
| S | S | S | 0 | 0 | 0 | 0 | 0 |
| 0 | 0 | 0 | 0 | 0 | S | 0 | 0 |
| S | 0 | 0 | 0 | 0 | 0 | 0 | 0 |
| 0 | 0 | 0 | S | 0 | 0 | 0 | 0 |

F I G. 16A

(S,S)(S,S)(S,S)(S,S)(S,0)(S,0)(S,0)(0,S)(S,S)(S,S)(0,S)(0,S)(0,0)(0,0)(0,0)(S,S)
(0,0)(0,0)(0,0)(0,0)(0,0)(0,0)(0,0)(0,0)(0,S)(0,S)(0,0)(0,0)(0,0)(0,0)(0,0)(0,0)

F I G. 16B

(S,S)(S,0)(S,0)(S,0)(S,S)(S,0)(S,0)(0,0)(S,S)(S,S)(S,0)(0,0)(S,0)(S,0)(0,0)(0,S)
(0,S)(0,S)(0,0)(0,0)(S,0)(S,0)(0,S)(0,0)(0,0)(0,0)(0,0)(0,0)(0,0)(0,0)(0,0)(0,0)

F I G. 16C

IMAGE CODER/DECODER, IMAGE CODING/DECODING METHOD, AND STORAGE MEDIUM

FIELD OF THE INVENTION

The present invention relates to a method and apparatus for coding and decoding an image and a storage medium.

BACKGROUND OF THE INVENTION

As a compression technique for a multilevel image, a conventional technique of segmenting a source image into blocks each constituted by a plurality of pixels, performing orthogonal transformation for each block, and quantizing the resultant data with a quantization threshold, thereby Huffman-coding the data is known. Such coding processing is used in the JPEG (Joint Photographic Experts Group) scheme. A coder/decoder implemented by forming this scheme into hardware is conventionally known.

In a coder implemented as hardware, attempts have been made to realize quantization processing at a high processing rate with a minimum circuit size. For example, orthogonal transformation factors converted in the zigzag scan sequence are processed for a plurality of factors at a time. The arrangement of a conventional coder will be described below.

A conventional coder performs orthogonal transformation, on a block basis, for an input source image segmented into a plurality of blocks by using an orthogonal transformer, and outputs orthogonal transformation factors. The output factors are rearranged in the zigzag scan sequence by a zigzag scan converter, and are output in twos to comparators. Corresponding quantization thresholds are also output in twos to the comparators. Each comparator compares the output factor with the corresponding quantization threshold and outputs comparison result information indicating whether the orthogonal transformation factor is smaller than the quantization threshold. This comparison result information is equivalent to information indicating whether the result obtained by quantizing the orthogonal transformation factor with the corresponding quantization threshold is 0.

A controller outputs control signals to selectors in accordance with output results from the comparators. More specifically, if at least one of quantization results on two orthogonal transformation factors is 0, the controller outputs control signals to the selectors to select one of the quantization results which is not 0 (significant factor) (if the two quantization results are 0, outputting control signals for selecting any quantization result exerts no influence on operation). If neither of the quantization results is 0, the controller outputs control signals to the selectors to alternately select the quantization results one by one in two cycles in accordance with the zigzag scan sequence. In addition, the controller outputs a format signal to the Huffman coder in accordance with the output results from the comparators. The format signal includes information indicating "a pair of 0 and significant factor" if one of the two orthogonal transformation factors is 0, "a pair of 0 and 0" if the two factors are 0, or "only one significant factor" if the two factors are significant factors (if the two factors are significant factors, since the factors are quantized one by one in two cycles, information indicating "only one significant factor" is consecutively output in two cycles), and information indicating, if the two factors are "a pair of 0 and significant factor", which comes first in the zigzag scan sequence.

As described above, if an orthogonal transformation factor is 0, a result (i.e., 0) can be obtained without quantization processing. If, therefore, at least one of two orthogonal transformation factors is 0, control is performed to quantize the two orthogonal transformation factors substantially in one cycle. If, however, the two factors are significant as a result of comparison, since neither of the factors is 0, quantization processing is required. For this reason, a processing time of two cycles is required.

In a hardware-implemented decoder, attempts have been made to perform inverse quantization processing at a high processing rate with a minimum circuit size. For example, a technique of initializing a memory by performing inverse quantization processing for only significant factors of quantized orthogonal transformation factors and writing the resultant data in the memory has been proposed. The arrangement of a conventional decoder will be described below.

The conventional decoder decodes Huffman-coded data by using a Huffman decoder and outputs zero-run information indicating a quantized orthogonal transformation factor and the number of 0s preceding it. The output quantized orthogonal transformation factor is input to an inverse quantization unit to be inversely quantized by using a quantization threshold which corresponds to the quantized orthogonal transformation factor and is output from a quantization threshold table. The resultant data is output as an orthogonal transformation factor to a selector.

An address generator calculates a specific position in a block as an orthogonal transformation processing unit to which the output quantized orthogonal transformation factor corresponds on the basis of the output zero-run information, and outputs a write address in a block memory which corresponds to the position and a read address in the quantization threshold table. In addition, the address generator outputs an initialization target address for initialization of the block memory before quantization processing to the block memory for each unit block, and also outputs, to a controller, a signal indicating that initialization is being performed. The initialization processing is preprocessing in which 0s are written before processing for the unit block to limit orthogonal transformation factors to be written in the block memory to significant factors (factors that are not 0) in an actual processing stage, thereby omitting write processing for insignificant factors (factors which are 0). In this case, only addresses at which significant factors are written may be initialized. For this purpose, the addresses at which the significant factors were written must be stored. Write addresses for initialization are generated on the basis of the stored address information.

The quantization threshold table reads out quantization thresholds corresponding to quantized orthogonal transformation factors to be processed on the basis of outputs from the write address generator, and outputs them to the inverse quantization unit. The controller outputs a 0 value as initialization data and a sequence selection signal indicating whether to select the initialization data to the selector on the basis of a signal indicating that initialization is being performed, and also outputs a control signal for controlling write/read operation of the block memory to the read address generator. The control signal provides instructions to start read operation upon completion of write operation for a unit orthogonal transformation block, read two factors per cycle, terminate read operation when data corresponding to a unit orthogonal transformation block is read, start writing initialization data for initialization processing, and start write operation for the next processing target orthogonal transformation block upon completion of the initialization processing.

During a read interval, the read address generator generates addresses so as to sequentially read out in the zigzag scan sequence data corresponding to a unit orthogonal transformation processing block, which is written in the block memory, on the basis of the write/read control signal output from the controller, and outputs the addresses to the block memory.

The block memory operates in cycles of initialization of each orthogonal transformation processing unit block, write, and read in the zigzag scan sequence. The block memory operates to write an output from the selector at a write address and perform read operation according to a read address in accordance with the read/write control signal output from the controller. The read value is output to an inverse orthogonal transformer.

The inverse orthogonal transformer sequentially performs inverse orthogonal transformation for the orthogonal transformation factors output from the block memory in the zigzag scan sequence, and outputs the transformation results for each unit block.

With the above arrangement, write processing for the block memory requires clock cycles equal in number to the significant factors existing in a unit block. Since factors are read in twos, if the number of samples in a unit block is 64, 32 clock cycles are required. Initialization requires clock cycles equal in number to the significant factors existing in a unit block.

If, for example, the number of samples in a unit block is 64 and 20 significant factors exist in the unit block to be processed, the total number of clock cycles required for processing for the processing target block is the sum of write processing=20 cycles, read processing=32 cycles, and initialization processing=20 cycle, i.e., 72 clock cycles.

The number of clock cycles required to process a given unit orthogonal transformation block (8×8=64 samples) is minimized when the number of significant factors in the processing target block is 0. In this case, the total number of clock cycles is the sum of write processing=0 cycle, read processing=32 cycles, and initialization processing=0 cycle, i.e., 32 cycles. In contrast to this, the number of clock cycles required to process a given unit orthogonal transformation block is maximized when the number of significant factors in the processing target block is 64. In this case, the total number of clock cycles is the sum of write processing=64 cycles, read processing=32 cycles, and initialization processing 64 cycles, i.e., 160 cycles.

According to the arrangement of the conventional coder, at least one of quantization results on a pair of orthogonal transformation factors input to the comparing means is preferably 0 from the viewpoint of processing speed. For this purpose, the respective elements of quantized orthogonal transformation factors in an orthogonal transformation block are preferably input to the comparing means in such a manner that significant factors are proportionally dispersed as much as possible. If, however, these factors are input in the zigzag scan sequence, significant factors tend to concentrate on some part of a block. This makes it difficult to increase the coding speed.

According to the arrangement of the conventional decoder, if the compression ratio is high and the number of significant factors occupying each unit orthogonal transformation block is small, a high decoding speed can be obtained. However, since initialization processing is performed for each orthogonal transformation block, the processing speed decreases rapidly as the proportion of significant factors increases. As a result, the difference in time required for decoding between data with a high compression ratio and data with a low compression ratio increases.

SUMMARY OF THE INVENTION

The present invention has been made in consideration of the above situation, and has as its object to improve the efficiency in coding/decoding process.

According to the present invention, the foregoing object is attained by providing an image coder which compares a predetermined number of orthogonal transformation factors from an orthogonal transformation unit with quantization thresholds equal in number to the orthogonal transformation factors, and selectively quantizes the orthogonal transformation factors on the basis of the comparison result in coding processing, comprising a first scan converter for rearranging the orthogonal transformation factors in a first scan sequence and outputting the predetermined number of factors at a time, and a second scan converter for rearranging quantized orthogonal transformation factors in a zigzag scan sequence and outputting the factors.

According to the present invention, the foregoing object is also attained by providing an image decoder which decodes an image by performing inverse quantization processing, scan sequence conversion processing, and inverse orthogonal transformation processing for input quantized orthogonal transformation factors, comprising a first scan converter for converting the quantized orthogonal transformation factors in a first scan sequence and outputting not less than two factors, a 0 determination unit for determining whether not less than two quantized orthogonal transformation factors output from the first scan converter are 0, and outputting a determination result, a first selector for selecting not less than one of not less two quantized orthogonal transformation factors, a second selector for selecting not less than one of two quantization thresholds corresponding to not less than two quantized orthogonal transformation factors, a controller for controlling the first and second selector in accordance with a result obtained by the 0 determination unit, and generating/outputting a format signal from the determination result obtained by the 0 determination unit, an inverse quantization computation unit for performing inverse quantization computation processing by using not less than one quantized orthogonal transformation factor and not less than one quantization threshold, and a second scan converter for rearranging orthogonal transformation factors output from the inverse quantization computation unit in a second scan sequence and outputting not less than two factors.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment/embodiments of the invention and, together with the description, serve to explain the principles of the invention.

FIG. 2A is a view showing a zigzag scan sequence;

FIG. 2B is a view showing a scan sequence in the present invention;

FIG. 2C is a view showing a scan sequence in the present invention;

FIG. 2D is a view showing a scan sequence in the present invention;

FIG. 2E is a view showing a scan sequence in the present invention;

FIG. 3 is a block diagram showing the arrangement of the second embodiment of the present invention;

FIG. 4A is a view showing a quantization result example of an 8×8 block;

FIG. 4B is a view showing the combination of factors obtained by arranging the factors in the quantization result example in FIG. 4A in twos in a zigzag scan sequence;

FIG. 4C is a view showing the combination of factors obtained by arranging the factors in the quantization result example in FIG. 4A in twos in the scan sequence shown in FIG. 2B;

FIG. 4D is a view showing the combination of factors obtained by arranging the factors in the quantization result example in FIG. 4A in twos in the scan sequence shown in FIG. 2C;

FIG. 4E is a view showing the combination of factors obtained by arranging the factors in the quantization result example in FIG. 4A in twos in the scan sequence shown in FIG. 2D;

FIG. 5A is a view showing a quantization result example of an 8×8 block;

FIG. 5B is a view showing the combination of factors obtained by arranging the factors in the quantization result example in FIG. 5A in twos in the zigzag scan sequence;

FIG. 5C is a view showing the combination of factors obtained by arranging the factors in the quantization result example in FIG. 5A in twos in the scan sequence shown in FIG. 2B;

FIG. 5D is a view showing the combination of factors obtained by arranging the factors in the quantization result example in FIG. 5A in twos in the scan sequence shown in FIG. 2C;

FIG. 5E is a view showing the combination of factors obtained by arranging the factors in the quantization result example in FIG. 5A in twos in the scan sequence shown in FIG. 2D;

FIG. 6A is a view showing a quantization result example of an 8×8 block;

FIG. 6B is a view showing the combination of factors obtained by arranging the factors in the quantization result example in FIG. 6A in twos in the zigzag scan sequence;

FIG. 6C is a view showing the combination of factors obtained by arranging the factors in the quantization result example in FIG. 6A in twos in the scan sequence shown in FIG. 2B;

FIG. 6D is a view showing the combination of factors obtained by arranging the factors in the quantization result example in FIG. 6A in twos in the scan sequence shown in FIG. 2C;

FIG. 6E is a view showing the combination of factors obtained by arranging the factors in the quantization result example in FIG. 6A in twos in the scan sequence shown in FIG. 2D;

FIG. 9A is a view showing an orthogonal transformation result example of an 8×8 block;

In FIG. 9B is a view showing the combination of factors obtained by arranging the factors in the orthogonal transformation result example in FIG. 9A in twos in the zigzag scan sequence;

FIG. 9C is a view showing the combination of factors obtained by arranging the factors in the orthogonal transformation result example in FIG. 9A in twos in the scan sequence shown in FIG. 2B;

FIG. 9D is a view showing the combination of factors obtained by arranging the factors in the orthogonal transformation result example in FIG. 9A in twos in the scan sequence shown in FIG. 2C;

FIG. 9E is a view showing the combination of factors obtained by arranging the factors in the orthogonal transformation result example in FIG. 9A in twos in the scan sequence shown in FIG. 2D;

FIG. 9F is a view showing the combination of factors obtained by arranging the factors in the orthogonal transformation result example in FIG. 9A in twos in the scan sequence shown in FIG. 2E;

FIG. 10A is a view showing an orthogonal transformation result example of an 8×8 block;

FIG. 10B is a view showing the combination of factors obtained by arranging the factors in the orthogonal transformation result example in FIG. 10A in twos in the zigzag scan sequence;

FIG. 10C is a view showing the combination of factors obtained by arranging the factors in the orthogonal transformation result example in FIG. 10A in twos in the scan sequence shown in FIG. 2B;

FIG. 10D is a view showing the combination of factors obtained by arranging the factors in the orthogonal transformation result example in FIG. 10A in twos in the scan sequence shown in FIG. 2C;

FIG. 10E is a view showing the combination of factors obtained by arranging the factors in the orthogonal transformation result example in FIG. 10A in twos in the scan sequence shown in FIG. 2D;

FIG. 10F is a view showing the combination of factors obtained by arranging the factors in the orthogonal transformation result example in FIG. 10A in twos in the scan sequence shown in FIG. 2E;

FIG. 11A is a view showing an orthogonal transformation result example of an 8×8 block;

FIG. 11B is a view showing the combination of factors obtained by arranging the factors in the orthogonal transformation result example in FIG. 11A in twos in the zigzag scan sequence;

FIG. 11C is a view showing the combination of factors obtained by arranging the factors in the orthogonal transformation result example in FIG. 11A in twos in the scan sequence shown in FIG. 2B;

FIG. 11D is a view showing the combination of factors obtained by arranging the factors in the orthogonal transformation result example in FIG. 11A in twos in the scan sequence shown in FIG. 2C;

FIG. 11E is a view showing the combination of factors obtained by arranging the factors in the orthogonal transformation result example in FIG. 11A in twos in the scan sequence shown in FIG. 2D;

FIG. 11F is a view showing the combination of factors obtained by arranging the factors in the orthogonal transformation result example in FIG. 11A in twos in the scan sequence shown in FIG. 2E;

FIG. 12B is a flow chart showing the flow of processing in the first embodiment of the present invention;

FIG. 14A is a view showing a quantization result example of an 8×8 block;

FIG. 14B is a view showing the combination of factors obtained by arranging the factors in the quantization result example in FIG. 14A in twos in the zigzag scan sequence;

FIG. 14C is a view showing the combination of factors obtained by arranging the factors in the quantization result example in FIG. 14A in twos in the scan sequence shown in FIG. 2E;

FIG. 15A is a view showing a quantization result example of an 8×8 block;

FIG. 15B is a view showing the combination of factors obtained by arranging the factors in the quantization result example in FIG. 15A in twos in the zigzag scan sequence;

FIG. 15C is a view showing the combination of factors obtained by arranging the factors in the quantization result example in FIG. 15A in twos in the scan sequence shown in FIG. 2E;

FIG. 16A is a view showing a quantization result example of an 8×8 block;

FIG. 16B is a view showing the combination of factors obtained by arranging the factors in the quantization result example in FIG. 16A in twos in the zigzag scan sequence; and FIG. 16C is a view showing the combination of factors obtained by arranging the factors in the quantization result example in FIG. 16A in twos in the scan sequence shown in FIG. 2E.

DETAILED DESCRIPTION OF THE PREFERRED EMBODIMENTS

Preferred embodiments of the present invention will be described in detail in accordance with the accompanying drawings.

First Embodiment

Figure 1:
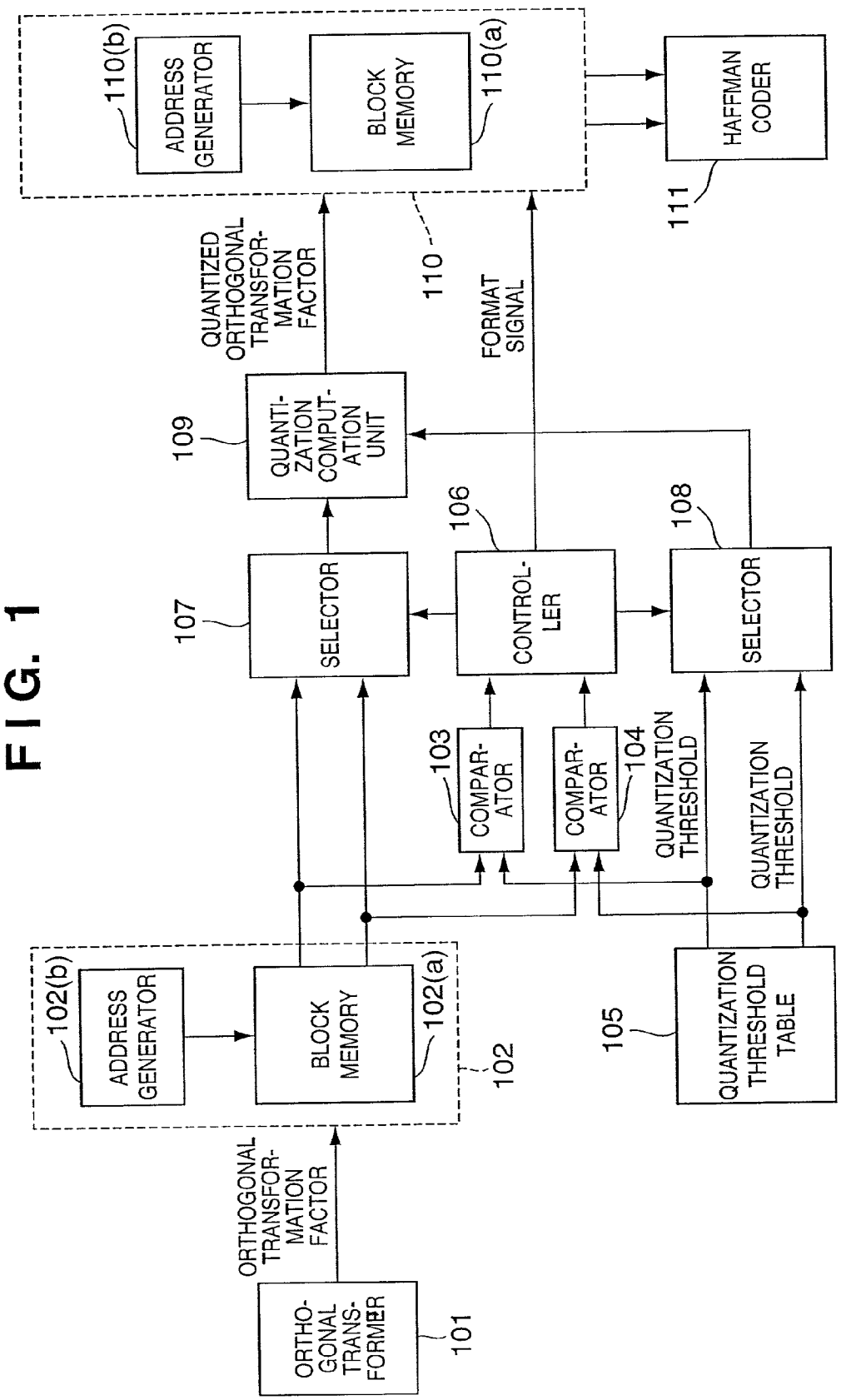
FIG. 1 is a block diagram showing the arrangement of the first embodiment of the present invention.

FIG. 1 shows an arrangement of a coder according to the first embodiment of the present invention. This embodiment is configured to process factors in twos. The flow charts of FIGS. 12A to 12D show the flow of processing.

Reference numeral 101 denotes an orthogonal transformer which receives the data obtained by segmenting a source image as a coding target into a plurality of blocks, performs orthogonal transformation for each block, and sequentially outputs orthogonal transformation factors to a first scan converter 102 (S1201).

The first scan converter 102 receives the orthogonal transformation factors output from the orthogonal transformer 101, rearranges the factors in a predetermined scan sequence (S1202), and outputs them in twos. The first scan converter 102 is comprised of, for example, a block memory 102(a) and address generator 102(b). The block memory 102(a) temporarily stores one-block orthogonal transformation factors output from the orthogonal transformer 101, and performs write/read operation in accordance with the addresses indicated by the address generator 102(b). The address generator 102(b) generates addresses to sequentially output the orthogonal transformation factors, which are read out from the block memory 102(a), in a predetermined scan sequence. In consideration of processing speed, an actual scan sequence is preferably set such that significant factors are dispersed as much as possible within each of the orthogonal transformation blocks. For example, the scan sequences shown in FIGS. 2B, 2C, and 2D and the like are advantageous.

A quantization threshold table 105 has table components rearranged in advance in correspondence with a predetermined scan sequence, and outputs, in twos, quantization thresholds corresponding to the orthogonal transformation factors output in twos from the first scan converter 102 (S1204). Comparators 103 and 104 respectively receive two pairs of orthogonal transformation factors and corresponding quantization thresholds output from the first scan converter 102 and quantization threshold table 105, and compare the orthogonal transformation factors with the quantization thresholds. Each comparator then outputs comparison result information indicating whether the orthogonal transformation factor is smaller than the quantization threshold (S1205). This comparison result information is equivalent to information indicating whether the result obtained by quantizing the orthogonal transformation factor with the corresponding quantization threshold becomes 0.

A controller 106 outputs control signals in accordance with the output results from the comparators 103 and 104. More specifically, if at least one of the quantization results on the two orthogonal transformation factors output from the first scan converter 102 is 0 (8-3), the controller 106 outputs control signals to selectors 107 and 108 to select the factor (significant factor) the quantization result of which is not 0 (if the two quantization results are 0, outputting control signals for selecting any quantization result exerts no influence on operation). If neither of the quantization results is 0, the controller 106 outputs control signals to the selectors to alternately select the quantization results one by one in two cycles in accordance with the scan sequence of factors converted by the first scan converter 102. In addition, the controller 106 outputs a format signal to the second scan converter 110 in accordance with the output results from the comparators 103 and 104. The format signal includes information indicating "a pair of 0 and significant factor" if one of the two orthogonal transformation factors output from the first scan converter 102 is 0, "a pair of 0 and 0" if the two factors are 0, or "only one significant factor" if the two factors are significant factors (if the two factors are significant factors, since the factors are quantized one by one in two cycles, information indicating "only one significant factor" is consecutively output in two cycles), and information indicating, if the two factors are "a pair of 0 and significant factor", which comes first in the scan sequence of factors converted by the first scan converter 102.

As described above, if an orthogonal transformation factor is 0, a result can be obtained (i.e., 0) without any quantization computation processing. If, therefore, at least one of two orthogonal transformation factors is 0, control is performed to quantize the two orthogonal transformation factors in one cycle.

The selector 107 selects one of the two orthogonal transformation factors output from the first scan converter 102 in accordance with the control signal output from the controller 106, and outputs the selected factor to a quantization computation unit 109.

The selector 108 selects one of the two quantization thresholds output from the quantization threshold table 105 in accordance with the control signal output from the controller 106, and outputs the selected threshold to the quantization computation unit 109. The quantization threshold output from the selector 108 becomes a quantization threshold that always corresponds to the orthogonal transformation factor output from the selector 107.

The quantization computation unit 109 outputs the quantization result obtained by dividing the output from the selector 107 by the output from the selector 108, and outputs the result to a second scan converter 110.

The second scan converter 110 rearranges outputs from the quantization computation unit 109 in a zigzag scan sequence in accordance with the format signal output from the controller 106 (S1219), and outputs them in twos to a Huffman coder 111 (S1220). The second scan converter 110 is comprised of, for example, a block memory 110(a) and address generator 110(b). The block memory 110(a) temporarily stores one-block outputs from the quantization computation unit 109 and performs write/read operation in accordance with the addresses indicated by the address generator 110(b). The address generator 110(b) generates addresses to output, in a zigzag sequence, the orthogonal transformation factors read out from the block memory 110(a).

The Huffman coder 111 sequentially codes the outputs from the second scan converter 110 into Huffman codes (S1221). As described above, if one of the quantization results on the two orthogonal transformation factors output from the first scan converter 102 is 0, it takes only a one-cycle processing time to quantize the two factors. If either of the two factors is not 0, since quantization processing based on division is required, it takes a two-cycle processing time to quantize the two factors.

Consider processing in which the following are obtained when the results obtained by quantizing the two orthogonal transformation factors output from the first scan converter 102 with quantization thresholds are arranged in the order in which the factors are output from the first scan converter 102.

Example: "0" indicates that the quantization result is 0, and "S" indicates that the quantization result is not 0 (i.e., a significant factor).

Quantization result: (0, S), (0, 0), (S, 0), (S, S)

Since one of the first pair (0, S) is 0 and the other is a significant factor, the controller 106 outputs control signals to the selectors 107 and 108 to select the significant factor (S1217), and simultaneously outputs, to the second scan converter 110, information indicating "a pair of 0 and significant factor" and information indicating which one of these factors comes first in the scan sequence of factors converted by the first scan converter 102 (S1216).

The quantization computation unit 109 outputs, to the second scan converter 110, the quantized orthogonal transformation factor (significant factor) obtained by dividing the significant factor output from the selector 107 by the quantization thresholds output from the selector 108 (S1218).

Since the next pair (0, 0) are both 0, the controller 106 outputs control signals to the selectors 107 and 108 to select one of the factors (either will do) (S1209). At the same time, the controller 106 outputs a format signal indicating "a pair of 0 and 0" to the second scan converter 110 (S1208).

The quantization computation unit 109 outputs, to the second scan converter 110, the quantized orthogonal transformation factor (which eventually becomes an insignificant factor in this case) obtained by dividing the factor output from the selector 107 by the quantization threshold output from the selector 108 (S1210).

Since one of the next pair (S, 0) is a significant factor, and the other is 0, the controller 106 outputs control signals to the selectors 107 and 108 to select the significant factor (S1217). At the same time, the controller 106 outputs, to the second scan converter 110, information indicating "a pair of 0 and significant factor" and information indicating which one of the factors comes first in the scan sequence of factors converted by the first scan converter 102 (S1216).

The quantization computation unit 109 outputs, to the second scan converter 110, the quantized orthogonal transformation factor (significant factor) obtained by dividing the significant factor output from the selector 107 by the quantization threshold output from the selector 108 (S1218).

Since neither of the next pair (S, S) is 0, the controller 106 outputs control signals to the selectors 107 and 108 to select one of them which comes first in the scan sequence of factors converted by the first scan converter 102 in the first cycle (S1212). At the same time, the controller 106 outputs information indicating "only one significant factor" to the second scan converter 110 (S1211). In the next cycle, the controller 106 outputs control signals to the selectors to select the factor that comes after in the scan sequence of factors converted by the first scan converter 102, and simultaneously outputs information indicating "only one significant factor" to the second scan converter 110 (S1214).

The quantization computation unit 109 performs quantization computation in two cycles by using the factors and quantization thresholds respectively output from the selector 107 and selector 108 in two cycles, and outputs the results as quantized orthogonal transformation factors to the second scan converter 110 in two cycles (S1213, S1215).

As described above, in the above case, quantization processing for eight factors is performed in a total of five cycles.

Second Embodiment

FIG. 3 shows an arrangement of a coder according to the second embodiment.

Reference numeral 301 denotes an orthogonal transformer which receives the data obtained by segmenting a source image as a coding target into a plurality of blocks, performs orthogonal transformation for each block, and sequentially outputs orthogonal transformation factors to a first scan converter 302. At the same time, the orthogonal transformer 301 outputs the frequency distribution information of the processing target blocks to a sequence selection signal generator 312. The sequence selection signal generator 312 outputs a sequence selection signal for selecting one of a plurality of scan sequences set in the first scan converter 302 on the basis of the frequency distribution information output from the orthogonal transformer 301.

Assume that disproportionally many significant factors are distributed in the upper half part, as in the case of the quantization result arrangement example shown in FIG. 5A. In this case, if scanning is performed in the scan sequences shown in FIGS. 2A to 2D, the numbers of pairs of (S, S) are 5, 2, 1, and 4, respectively. If, therefore, the first scan converter 302 performs scanning in the scan sequence shown in FIG. 2C, the number of pairs of (S, S) becomes small. Assume that disproportionally many significant factors are distributed in the left half, as in the case of the quantization result arrangement example shown in FIG. 6A. In this case, if scanning is performed in the scan sequences shown in FIGS. 2A to 2D, the numbers of pairs of (S, S) are 5, 2, 4, and 1, respectively. If, therefore, the first scan converter 302 performs scanning in the scan sequence shown in FIG. 2D, the number of pairs of (S, S) becomes small. As described above, the sequence selection signal generator 312 generates a sequence selection signal to select a scan sequence that is advantageous in terms of processing speed on the basis of the frequency distribution information of each processing target block.

The first scan converter 302 receives the orthogonal transformation factors output from the orthogonal transformer 301, selects one of a plurality of scan sequences prepared in advance in accordance with the sequence selection signal output from the sequence selection signal generator 312, rearranges the factors in the selected scan sequence, and outputs the factors in twos. The first scan converter 302 is comprised of a block memory 302(a), an address generator 1 302(b), an address generator 2 302(c), and an address generator 3 302(d), and a selector 302(e) for selecting one of outputs from the address generator 1 302(b), address generator 2 302(c), and address generator 3 302 (d). The block memory 302 (a) temporarily stores one-block orthogonal transformation factors output from the orthogonal transformer 301, and performs read/write operation in accordance with the addresses indicated by the selector 3 302 (e). When orthogonal transformation factors are read out from the block memory 302(a), the address generator 1 302(b), address generator 2 302(c), and address generator 3 302(d) respectively generate addresses such that the factors are output in predetermined scan sequences like the scan sequences shown in FIGS. 2B, 2C, and 2D.

A quantization threshold table 305 outputs, in twos, quantization thresholds corresponding to the orthogonal transformation factors output in twos from the first scan converter 302 in accordance with the sequence selection signal output from the sequence selection signal generator 312.

Comparators 303 and 304 respectively receive two pairs of orthogonal transformation factors and corresponding quantization thresholds output from the first scan converter 302 and quantization threshold table 305, and compare the orthogonal transformation factors with the quantization thresholds. Each comparator then outputs comparison result information indicating whether the orthogonal transformation factor is smaller than the quantization threshold. This comparison result information is equivalent to information indicating whether the result obtained by quantizing the orthogonal transformation factor with the corresponding quantization threshold becomes 0.

A controller 306 outputs control signals in accordance with the output results from the comparators 303 and 304. More specifically, if at least one of the quantization results on the two orthogonal transformation factors output from the first scan converter 302 is 0, the controller 306 outputs control signals to selectors 307 and 308 to select the factor the quantization result of which is not 0 (if the two quantization results are 0, outputting control signals for selecting any quantization result exerts no influence on operation). If neither of the quantization results is 0, the controller 306 outputs control signals to the selectors to alternately select the quantization results one by one in two cycles in accordance with the scan sequence selected by the first scan converter 302. In addition, the controller 306 outputs a format signal to the second scan converter 310 in accordance with the output results from the comparators 303 and 304. The format signal includes information indicating "a pair of 0 and significant factor" if one of the two orthogonal transformation factors output from the first scan converter 302 is 0, "a pair of 0 and 0" if the two factors are 0, or "only one significant factor" if the two factors are significant factors (if the two factors are significant factors, since the factors are quantized one by one in two cycles, information indicating "only one significant factor" is consecutively output in two cycles), and information indicating, if the two factors are "a pair of 0 and significant factor", which of the pair of 0 and significant factor comes first in the scan sequence of factors converted by the first scan converter 302.

As described above, if an orthogonal transformation factor is 0, a result can be obtained (i.e., 0) without any quantization computation processing. If, therefore, at least one of two orthogonal transformation factors is 0, control is performed to quantize the two orthogonal transformation factors in one cycle.

The selector 307 selects one of the two orthogonal transformation factors output from the first scan converter 302 in accordance with the control signal output from the controller 306, and outputs the selected factor to a quantization computation unit 309. The selector 308 selects one of the two quantization thresholds output from the quantization threshold table 305 in accordance with the control signal output from the controller 306, and outputs the selected threshold to the quantization computation unit 309. The quantization threshold output from the selector 308 becomes a quantization threshold that always corresponds to the orthogonal transformation factor output from the selector 307.

The quantization computation unit 309 outputs the quantization result obtained by dividing the output from the selector 307 by the output from the selector 308, and outputs the result to a second scan converter 310.

The second scan converter 310 rearranges outputs from the quantization computation unit 309 in a zigzag scan sequence in accordance with the format signal output from the controller 306, and outputs them in twos to a Huffman coder 311. The second scan converter 310 is comprised of, for example, a block memory 310(a), an address generator 4 310(b), an address generator 5 310(c), and an address generator 6 310(d), and a selector 310(e) for selecting one of outputs from the address generator 4 310(b), address generator 5 310(c), and address generator 6 310(d) in accordance with the sequence selection signal output from the orthogonal transformer 301. The block memory 310(a) temporarily stores one-block outputs from the quantization computation unit 309 and performs write/read operation in accordance with the addresses output from the selector 310(e). The address generator 4 310(b), address generator 5 310(c), and address generator 6 310(d) respectively generate addresses to output, in a zigzag sequence, the quantized orthogonal transformation factors read out from the block memory 310(a).

The Huffman coder 311 sequentially Huffman-codes the output from the second scan converter 310.

FIG. 4A shows an example in which orthogonal transformation and quantization are performed for an image segmented into blocks each constituted by 8×8 pixels. Referring to FIG. 4A, "S" indicates a significant factor, and "0" indicates an insignificant factor. It is generally known that power concentrates on DC components and low-frequency components in many images upon orthogonal transformation. In addition, in many cases, large values are assigned to quantization thresholds corresponding to high-frequency components considering that the human visual characteristics are insensitive to high-frequency components. For this reason, as shown in FIG. 4A, significant factors tend to continuously concentrate on the upper left part of an orthogonal transformation block, i.e., an early part of the zigzag scan sequence.

If factors are extracted and arranged in twos in the zigzag scan sequence in the quantization result arrangement example shown in FIG. 4A, the arrangement shown in FIG. 4B is obtained. In this case, since there are seven pairs of (S, S), the quantization processing time for 64 factors is 7×2+(32−7)=39 cycles. That is, in the example shown in FIG. 4A, with the conventional arrangement, a quantization processing time of 39 cycles is required.

In contrast to this, with the arrangement according to the first embodiment of the present invention, the following are the processing times required for quantization processing.

First of all, when the scan sequence shown in FIG. 2B is selected, and the factors in the quantization result arrangement example shown in FIG. 4A are arranged in twos, the arrangement shown in FIG. 4C is obtained. In this case, since there are two pairs of (S, S), the quantization processing time for 64 factors is 2×2+(32−2)=34 cycles.

Next, when the scan sequence shown in FIG. 2C is selected, and the factors in the quantization result arrangement example shown in FIG. 4A are arranged in twos, the arrangement shown in FIG. 4D is obtained. In this case, since there is one pair of (S, S), the quantization processing time for 64 factors is 1×2+(32−1)=33 cycles.

Next, when the scan sequence shown in FIG. 2D is selected, and the factors in the quantization result arrangement example shown in FIG. 4A are arranged in twos, the arrangement shown in FIG. 4E is obtained. In this case, since there are two pairs of (S, S), the quantization processing time for 64 factors is 2×2+(32−2)=34 cycles.

As described above, the difference between the number of cycles for each 8×8 block according to the conventional scan sequence and that according to the scan sequence in the present invention is five when the scan sequences shown in FIGS. 2B and 2D are selected, and six when the scan sequence shown in FIG. 2C is selected. If this difference is converted in terms of the entire image (pixel count Na), the difference (D) in the number of cycles can be given by the following equations.

If the total number of pixels is 2,000,000, D=(Na/64)×5 [cycles].

If the scan sequence shown in FIG. 2B is selected, $$D=(200\times10^6/64)\times5=15.6\times10^6 \text{ [cycles]}$$

If the scan sequence shown in FIG. 2C is selected, $$D=(200\times10^6/64)\times6=18.75\times10^6 \text{ [cycles]}$$

Third Embodiment

Note that a scan sequence in a raster scan longitudinal direction like that shown in FIG. 2E or the raster scan sequence may be used instead of a scan sequence based on a complex arrangement of high- and low-frequency components shown in FIGS. 2B to 2D. A case where the scan sequence in the raster scan longitudinal direction is used will be described in detail below.

FIG. 14A shows an example in which orthogonal transformation and quantization are performed for an image segmented into blocks each constituted by 8×8 pixels. As in the case shown in FIG. 4A, in the case shown in FIG. 14A, "S" indicates a significant factor, and "0" indicates an insignificant factor.

In the example shown in FIG. 14A, when factors are extracted in twos in the zigzag scan sequence and arranged, the arrangement shown in FIG. 14B is obtained. In this case, since there are nine pairs of (S, S), the quantization processing time for 64 factors is 9×2+(32−9)=41 cycles. That is, in the example (the arrangement according to the prior art) shown in FIG. 14A, a quantization processing time of 41 cycles is required.

In contrast to this, when the scan sequence shown in FIG. 2E is used, the following processing time is required for quantization processing. When the scan sequence shown in FIG. 2E is used, and the factors in the example shown in FIG. 14A are arranged in twos in the scan sequence, the arrangement shown in FIG. 14C is obtained. In this case, since there are six pairs of (S, S), the quantization processing time for 64 factors is 6×2+(32−6)=38 cycles.

FIG. 15A shows another example in which orthogonal transformation and quantization are performed for an image segmented into blocks each constituted by 8×8 pixels. As in the example shown in FIG. 4A, in the example shown in FIG. 15A, "S" indicates a significant factor, and "0" indicates an insignificant factor.

In the example shown in FIG. 15A, when factors are extracted in twos in the zigzag scan sequence and arranged, the arrangement shown in FIG. 15B is obtained. In this case, since there are eight pairs of (S, S), the quantization processing time for 64 factors is 8×2+(32−8)=40 cycles. That is, in the example (the arrangement according to the prior art) shown in FIG. 15A, a quantization processing time of 40 cycles is required.

In contrast to this, when the scan sequence shown in FIG. 2E is used, the following processing time is required for quantization processing. When the scan sequence shown in FIG. 2E is used, and the factors in the example shown in FIG. 15A are arranged in twos in the scan sequence, the arrangement shown in FIG. 15C is obtained. In this case, since there are five pairs of (S, S), the quantization processing time for 64 factors is 5×2+(32−5)=37 cycles.

FIG. 16A shows an example in which orthogonal transformation and quantization are performed for an image segmented into blocks each constituted by 8×8 pixels. As in the case shown in FIG. 4A, in the case shown in FIG. 16A, "S" indicates a significant factor, and "0" indicates an insignificant factor.

In the example shown in FIG. 16A, when factors are extracted in twos in the zigzag scan sequence and arranged, the arrangement shown in FIG. 16B is obtained. In this case, since there are seven pairs of (S. S), the quantization processing time for 64 factors is 7×2+(32−7)=39 cycles. That is, in the example (the arrangement according to the prior art) shown in FIG. 16A, a quantization processing time of 39 cycles is required.

In contrast to this, when the scan sequence shown in FIG. 2E is used, the following processing time is required for quantization processing.

When the scan sequence shown in FIG. 2E is used, and the factors in the example shown in FIG. 16A are arranged in twos in the scan sequence, the arrangement shown in FIG. 16C is obtained. In this case, since there are four pairs of (S, S), the quantization processing time for 64 factors is 4×2+(32−4)=36 cycles.

As described above, the number of cycles can be sufficiently reduced even by using the scan sequence shown in FIG. 2E.

Fourth Embodiment

Figure 7:
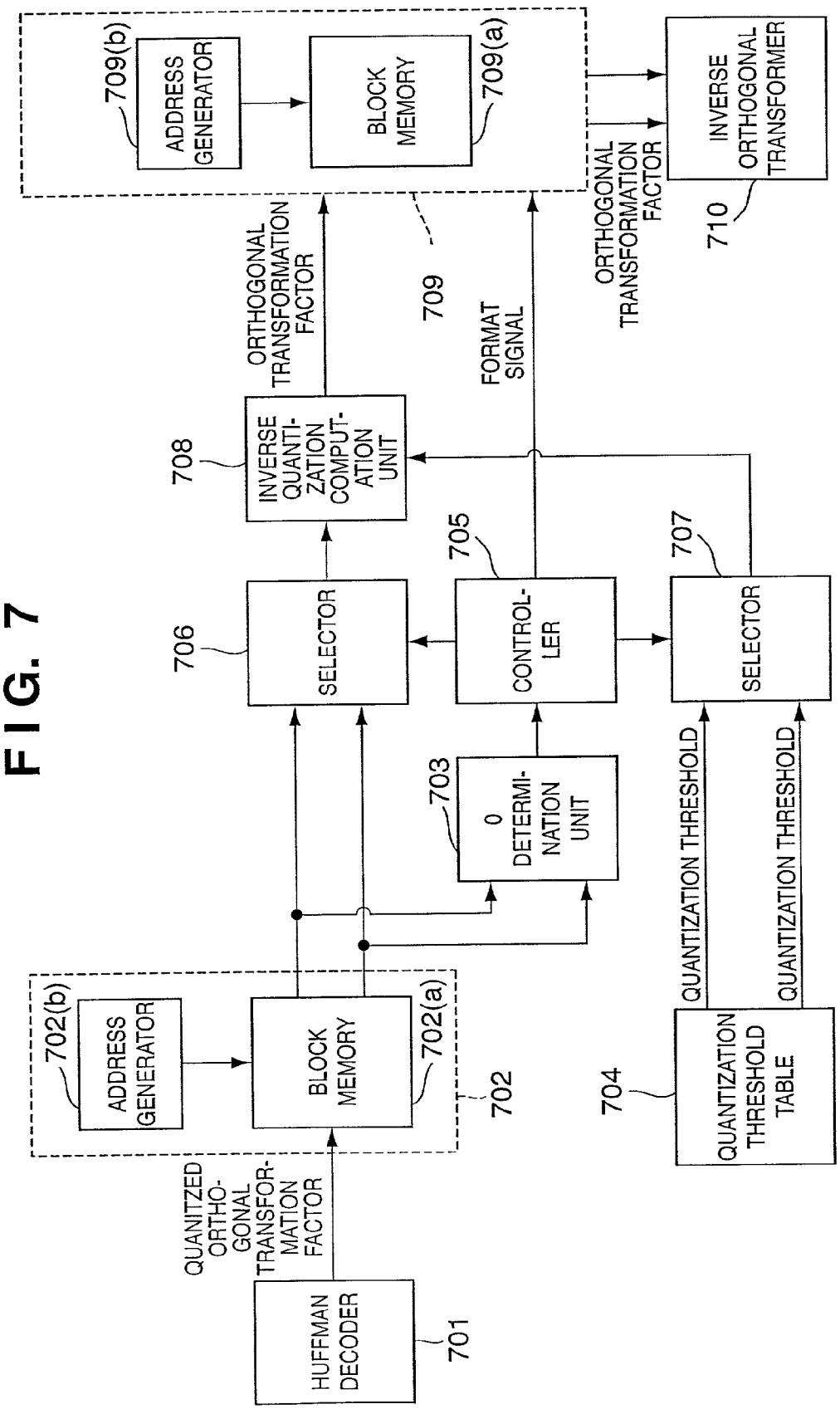
FIG. 7 is a block diagram showing the arrangement of the fourth embodiment of the present invention.

FIG. 7 shows the fourth embodiment. Reference numeral 701 denotes a Huffman decoder for decoding Huffman-coded data and outputting the resultant data as quantized orthogonal transformation factors to a first scan converter 702 (S1301).

The first scan converter 702 receives the quantized orthogonal transformation factors output from the Huffman decoder 701, rearranges them in a predetermined scan sequence (S1302), and outputs them in twos (S1303). The first scan converter 702 is comprised of a block memory 702(a) and address generator 702(b). The block memory 702(a) temporarily stores one-block quantized orthogonal transformation factors output from the Huffman decoder 701 and performs write/read operation in accordance with the addresses indicated by the address generator 702(b). The address generator 702(b) generates addresses to sequentially output the quantized orthogonal transformation factors, which are read out from the block memory 702(a), in a predetermined scan sequence. In consideration of processing speed, an actual scan sequence is preferably set such that significant factors are dispersed as much as possible within each of the orthogonal transformation blocks. For example, the scan sequences shown in FIGS. 2B, 2C, and 2D and the like are advantageous.

A quantization threshold table 704 outputs, in twos, quantization thresholds corresponding to the quantized orthogonal transformation factors output in twos from the first scan converter 702 (S1304).

A 0 determination unit 703 receives the two quantized orthogonal transformation factors output from the first scan converter 702, determines whether each of the input quantized orthogonal transformation factors is 0, and outputs the determination result to a controller 705 (S1305).

A controller 705 outputs control signals in accordance with the output results from the 0 determination unit 703. More specifically, if at least one of the two quantized orthogonal transformation factors output from the first scan converter 702 is 0, the controller 705 outputs control signals to selectors 706 and 707 to select the factor which is not 0 (significant factor) (if the two factors are 0, outputting control signals for selecting any factor exerts no influence on operation). If neither of the factors is 0, the controller 705 outputs control signals to the selectors to alternately select the factors one by one in two cycles in accordance with the scan sequence output from the first scan converter 702. In addition, the controller 705 outputs a format signal to a second scan converter 709 in accordance with the output results from the 0 determination unit 703. The format signal includes information indicating "a pair of 0 and significant factor" if one of the two quantized orthogonal transformation factors output from the first scan converter 702 is 0, "a pair of 0 and 0" if the two factors are 0, or "only one significant factor" if the two factors are significant factors (if the two factors are significant factors, since the factors are inversely quantized one by one in two cycles, information indicating "only one significant factor" is consecutively output in two cycles), and information indicating, if the two factors are "a pair of 0 and significant factor", which of the pair of 0 and significant factor comes first in the scan sequence of factors converted by the first scan converter 702.

As described above, if a quantized orthogonal transformation factor is 0, a result can be obtained (i.e., 0) without any inverse quantization computation processing. If, therefore, at least one of two quantized orthogonal transformation factors is 0, control is performed to inversely quantize the two orthogonal transformation factors substantially in one cycle.

The selector 706 selects one of the two quantized orthogonal transformation factors output from the first scan converter 702 in accordance with the control signal output from the controller 705, and outputs the selected factor to an inverse quantization computation unit 708. The selector 707 selects one of the two quantization thresholds output from the quantization threshold table 704 in accordance with the control signal output from the controller 705, and outputs the selected threshold to the inverse quantization computation unit 708. The quantization threshold output from the selector 707 becomes a quantization threshold that always corresponds to the quantized orthogonal transformation factor output from the selector 706.

The inverse quantization computation unit 708 outputs, to the second scan converter 709, the inverse quantization results obtained by multiplying outputs from the selector 706 by outputs from the selector 707.

The second scan converter 709 rearranges the outputs from the inverse quantization computation unit 708 in a predetermined scan sequence in accordance with the format signal output from the controller 705 (S1319), and outputs the results in twos to an inverse orthogonal transformer 710 (S1320). The second scan converter 709 is comprised of a block memory 709(a) and address generator 709(b). The block memory 709(a) temporarily stores one-block outputs from the inverse quantization computation unit 708 and performs write/read operation in accordance with the addresses output from the address generator 709(b). The address generator 709(b) generates addresses to output, in a predetermined scan sequence, the orthogonal transformation factors read out from the block memory 709(a). The actual scan conversion sequence executed by the second scan converter 709 should be determined in accordance with the arrangement of the inverse orthogonal transformer 710. For example, a raster scan sequence or a vertical raster scan sequence is generally used.

The inverse orthogonal transformer 710 sequentially performs inverse orthogonal transformation processing for outputs from the second scan converter 709 (S1321).

As described above, the above arrangement includes a 0 determination unit like the one described above to check before inverse quantization processing whether an inverse quantization result on each quantized orthogonal transformation factor becomes 0. If at least one of the results becomes 0, there is no need to perform multiplication processing. Therefore, the two factors, i.e., this factor and the other factor, can be inversely quantized in one cycle by one inverse quantization computation unit.

Processing to be performed when the two quantized orthogonal transformation factors output from the first scan converter 702 become the following factors will be described as an example.

Example: "0" indicates that a quantized orthogonal transformation factor is 0, and "S" indicates that a quantized orthogonal transformation factor is not 0 (e.g., a significant factor).

Quantized orthogonal transformation factors: (0, S), (0, 0), (S, 0), (S, S)

First of all, since one of the first pair (0, S) is 0, and the other is a significant factor, the controller 705 outputs control signals to the selectors 706 and 707 to select the significant factor, and simultaneously outputs, to the second scan converter 709, information indicating "a pair of 0 and significant factor" and information indicating which of the factors comes first in the scan sequence of factors converted by the first scan converter 702 (S1316).

The inverse quantization computation unit 708 outputs, to the second scan converter 709, the orthogonal transformation factor (significant factor) obtained by multiplying the significant factor output from the selector 706 by the quantization threshold output from the selector 707 (S1318).

Since the next pair (0, 0) are both 0, the controller 705 outputs control signals to the selectors 706 and 707 to select one of the factors (either will do) (S1314). At the same time, the controller 705 outputs information indicating "a pair of 0 and 0" to the second scan converter 709 (S1313).

The inverse quantization computation unit 708 outputs, to the second scan converter 709, the quantized orthogonal transformation factor (which eventually becomes an insignificant factor in this case) obtained by multiplying the factor output from the selector 706 by the quantization threshold output from the selector 707 (S1315).

Since one of the next pair (S, 0) is a significant factor, and the other is 0, the controller 705 outputs control signals to the selectors 706 and 707 to select the significant factor (S1317). At the same time, the controller 705 outputs, to the second scan converter 709, information indicating "a pair of 0 and significant factor" and information indicating which one of the factors comes first in the scan sequence of factors converted by the first scan converter 702 (S1316).

The inverse quantization computation unit 708 outputs, to the second scan converter 709, the orthogonal transformation factor (significant factor) obtained by multiplying the factor output from the selector 706 by the quantization threshold output from the selector 707 (S1318).

Since neither of the next pair (S, S) is 0, the controller 705 outputs control signals to the selectors 706 and 707 to select one of them which comes first in the scan sequence of factors converted by the first scan converter 702 in the first cycle (S1308). At the same time, the controller 705 outputs information indicating "only one significant factor" to the second scan converter 709 (S1309). In the next cycle, the controller 705 outputs control signals to the selectors to select the factor that comes after in the scan sequence of factors converted by the first scan converter 702, and simultaneously outputs information indicating "only one significant factor" to the second scan converter 709 (S1311).

The inverse quantization computation unit 708 performs inverse quantization computation in two cycles by using the factors and quantization thresholds respectively output from the selector 706 and selector 707 in two cycles, and outputs the results as quantized orthogonal transformation factors to the second scan converter 709 in two cycles (S1310 and S1312).

As described above, in the above example, inverse quantization processing for eight factors can be performed in a total of five cycles.

Fifth Embodiment

Figure 8:
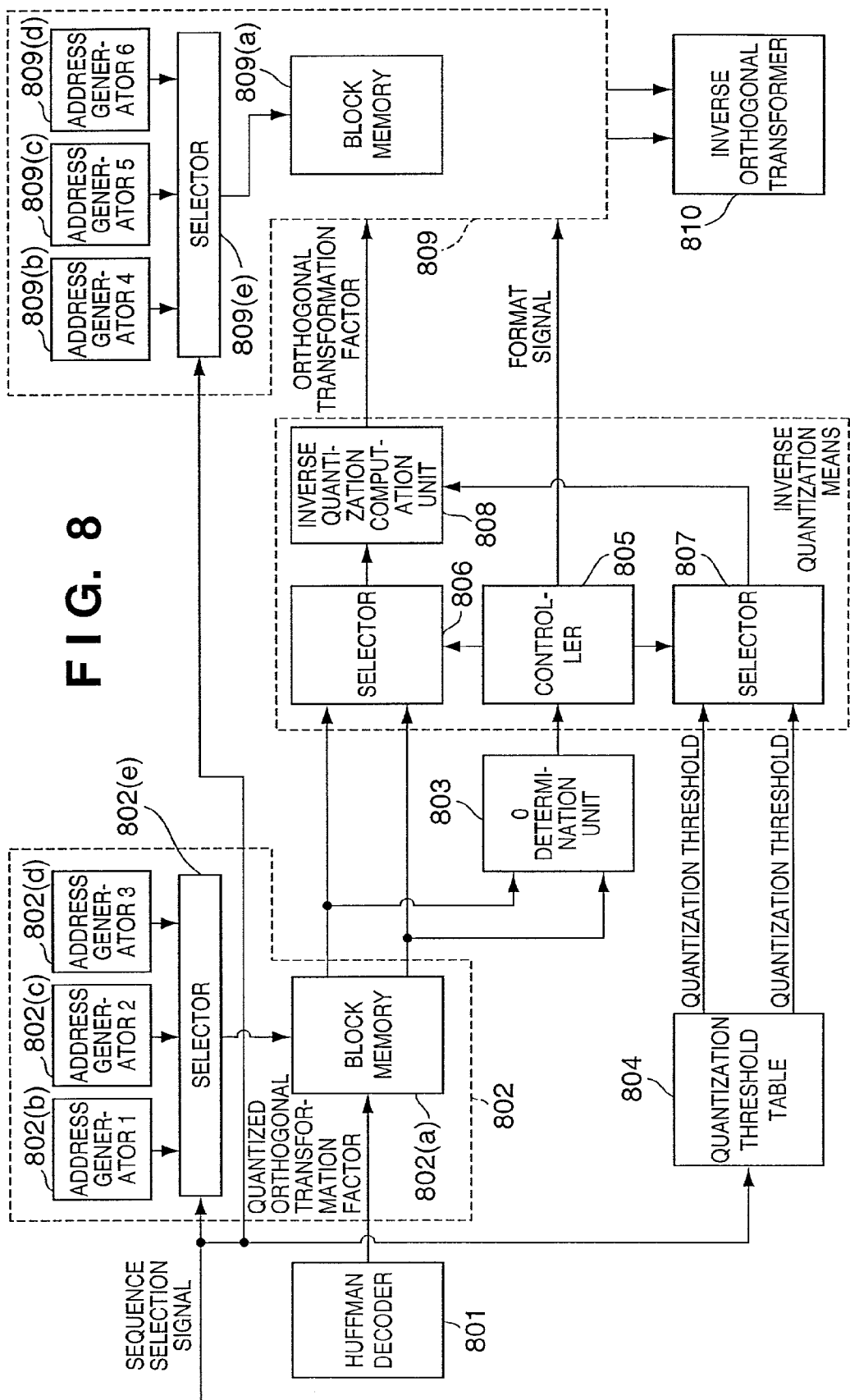
FIG. 8 is a block diagram showing the arrangement of the fifth embodiment of the present invention.
Figure 12A:
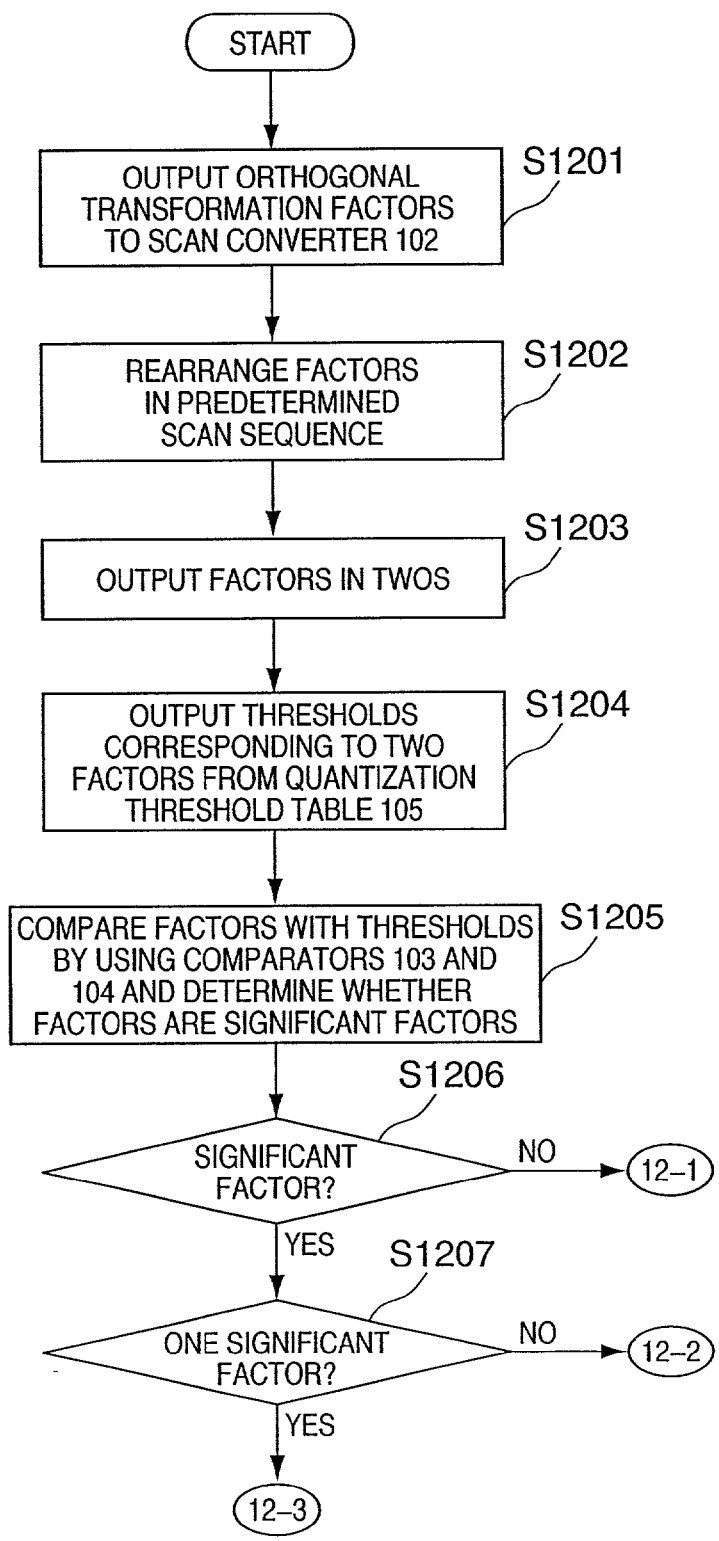
FIG. 12A is a flow chart showing the flow of processing in the first embodiment of the present invention.
Figure 12C:
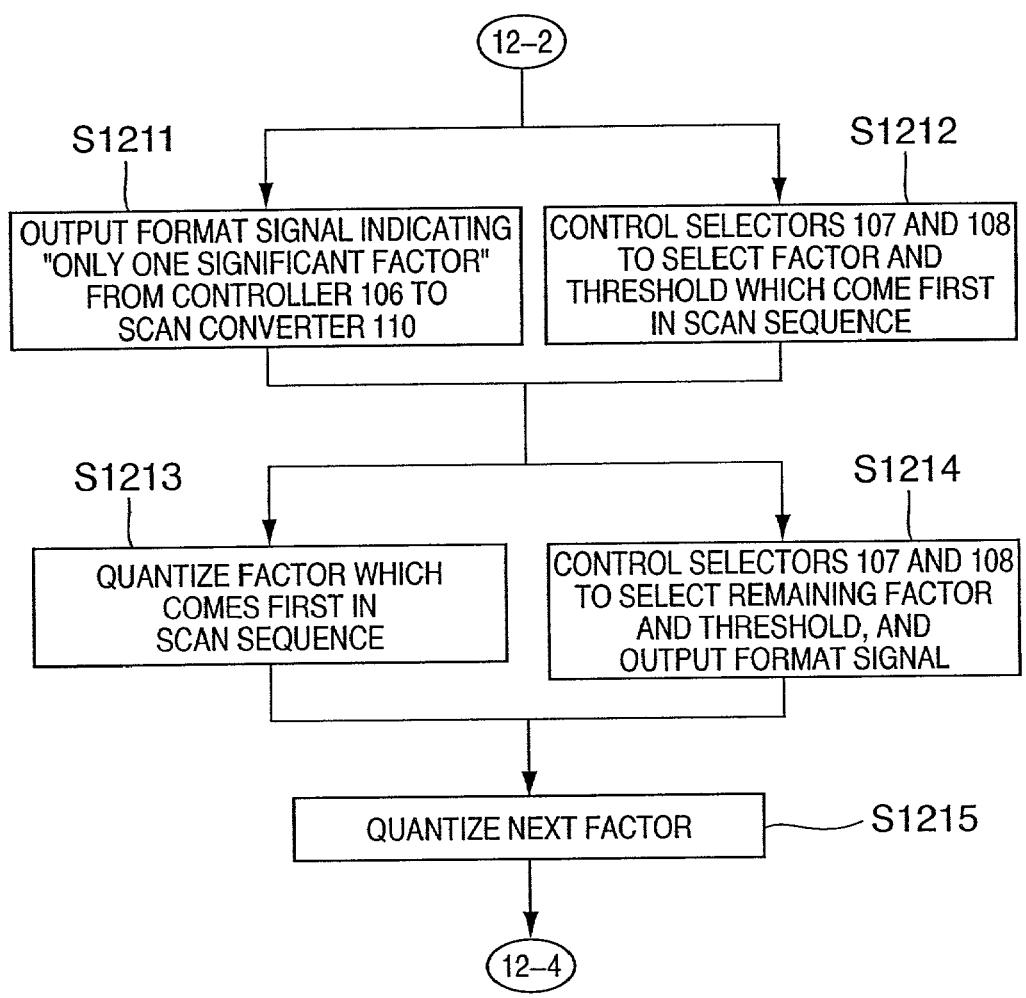
FIG. 12C is a flow chart showing the flow of processing in the first embodiment of the present invention.
Figure 12D:
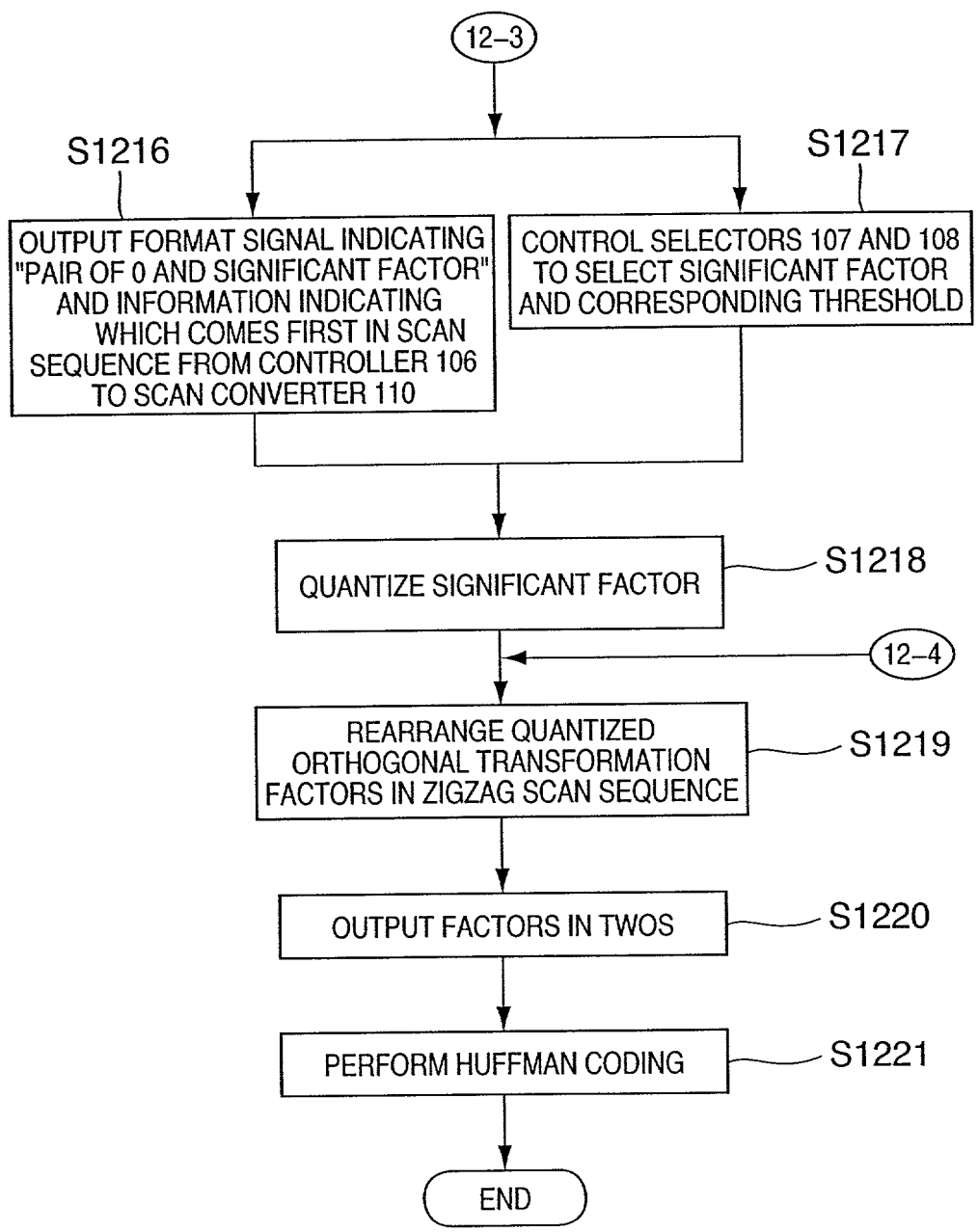
FIG. 12D is a flow chart showing the flow of processing in the first embodiment of the present invention.
Figure 13A:
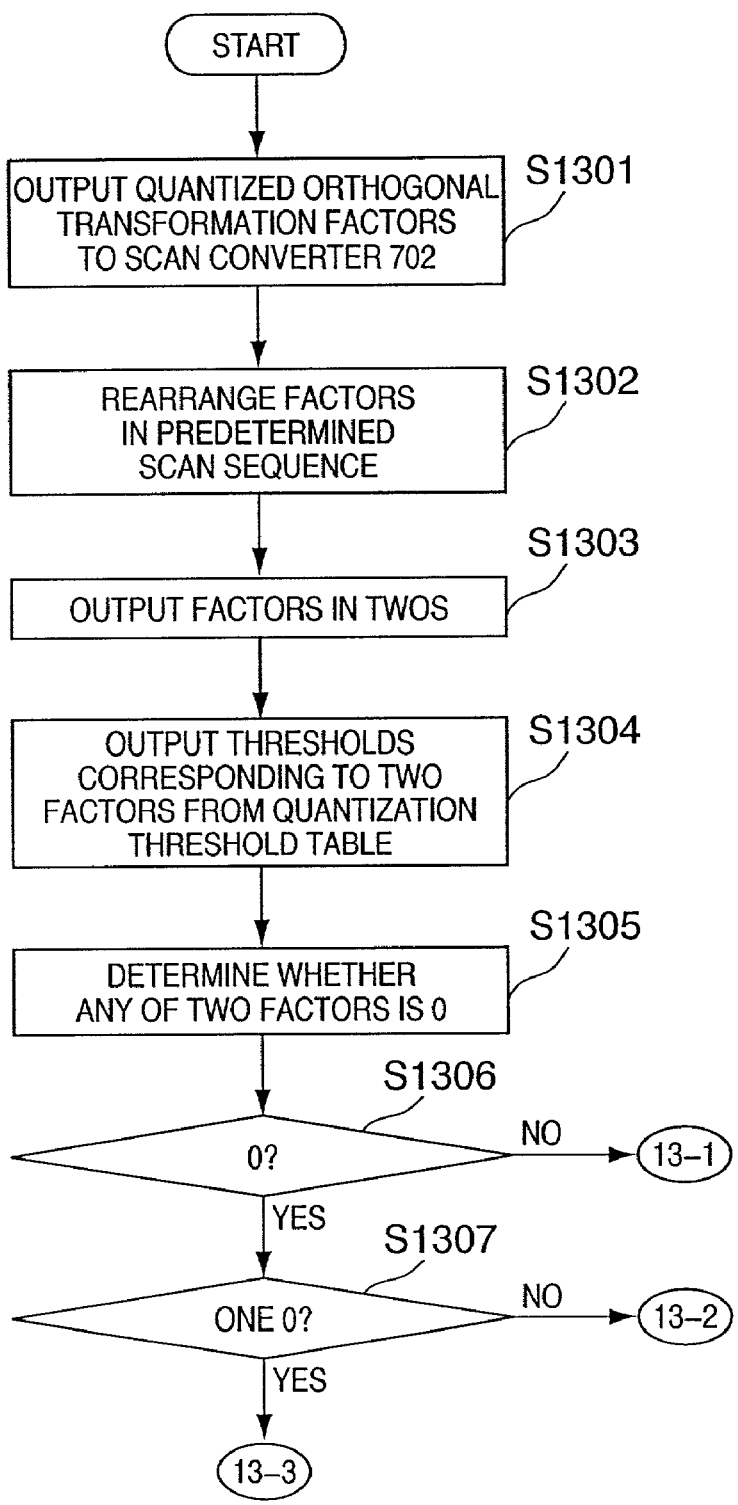
FIG. 13A is a flow chart showing the flow of processing in the fourth embodiment of the present invention.
Figure 13B:
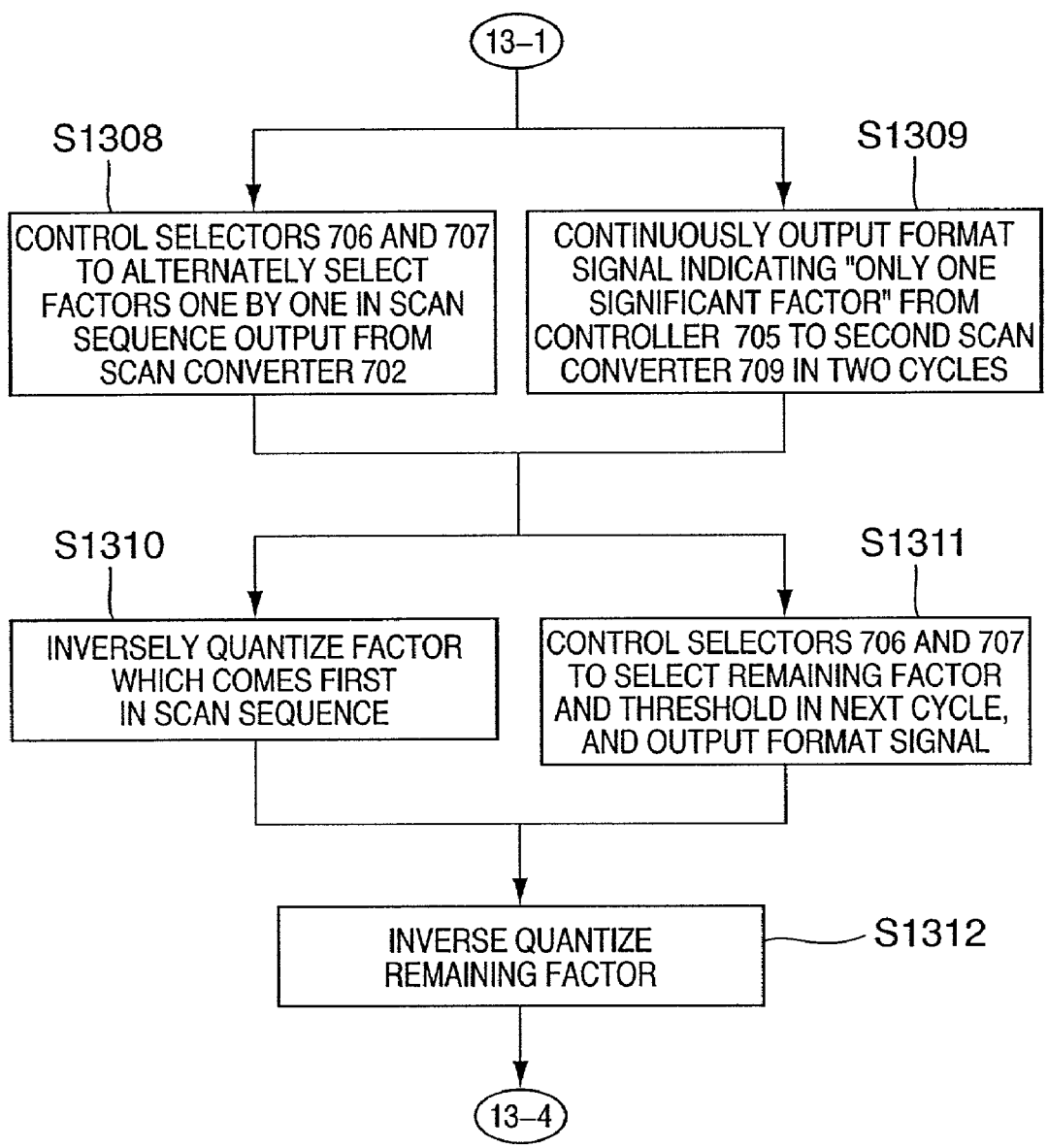
FIG. 13B is a flow chart showing the flow of processing in the fourth embodiment of the present invention.
Figure 13C:
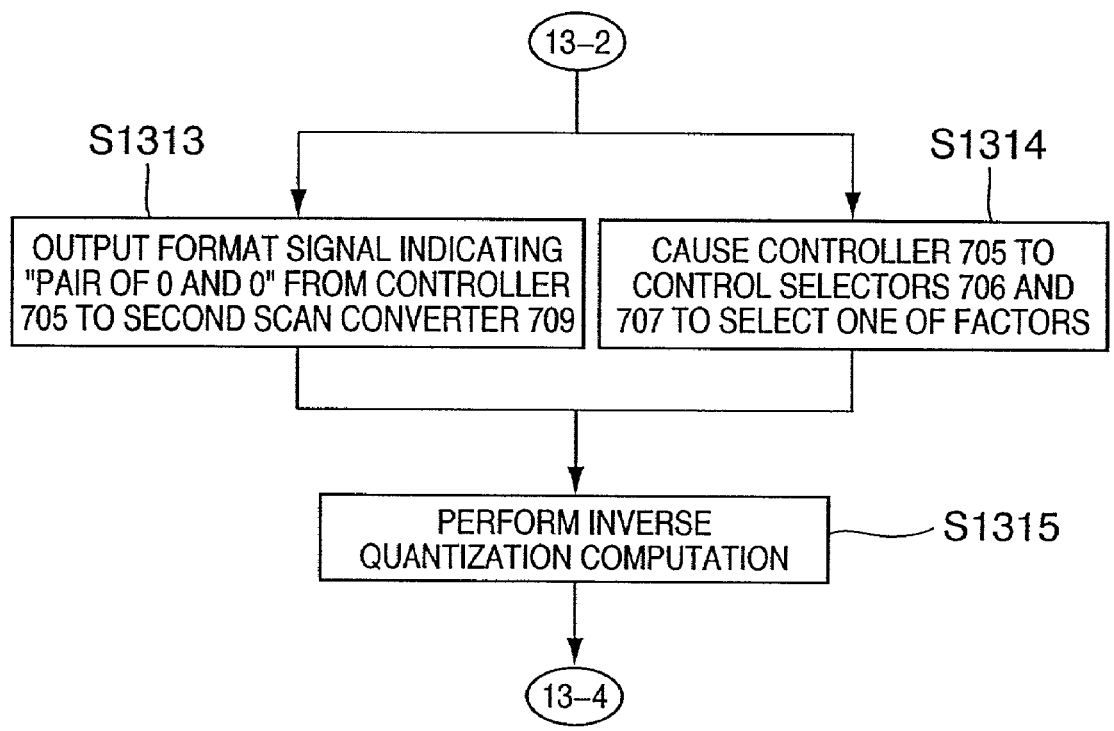
FIG. 13C is a flow chart showing the flow of processing in the fourth embodiment of the present invention.
Figure 13D:
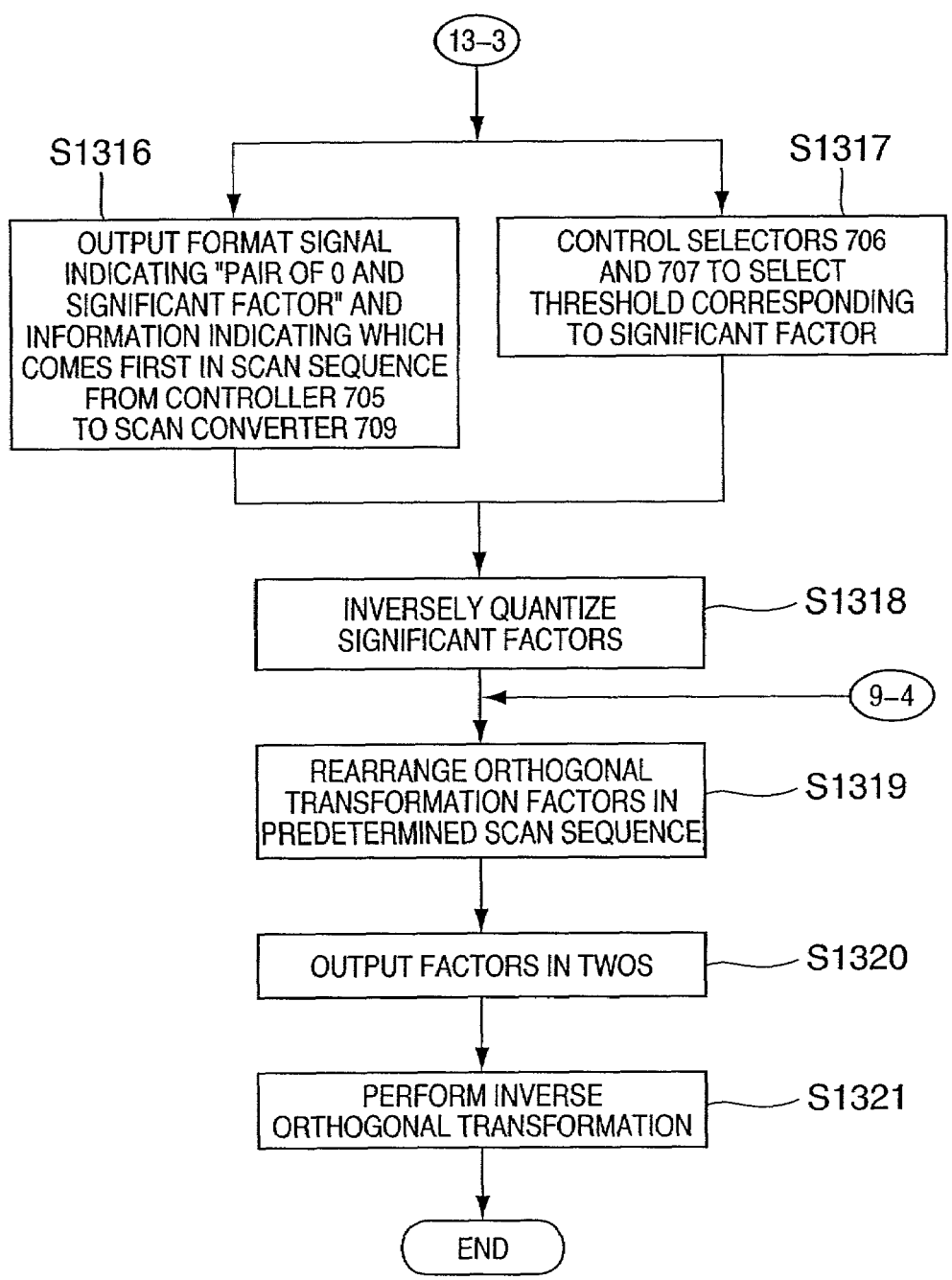
FIG. 13D is a flow chart showing the flow of processing in the fourth embodiment of the present invention.

FIG. 8 shows an arrangement of a decoder according to the fifth embodiment of the present invention.

Reference numeral 801 denotes a Huffman decoder for decoding Huffman-coded data and outputting the resultant data as quantized orthogonal transformation factors to a first scan converter 802. The first scan converter 802 receives the quantized orthogonal transformation factors output from the Huffman decoder 801, selects one of a plurality of predetermined scan sequences in accordance with a predetermined sequence selection signal, rearranges the factors in the selected scan sequence, and outputs the factors in twos.

The first scan converter 802 is comprised of a block memory 802(a), an address generator 1 802(b), an address generator 2 802(c), an address generator 3 802(d), and a selector 802(e) for selecting one of outputs from the address generator 1 802(b), address generator 2 802(c), and address generator 3 802(d) in accordance with the sequence selection signal. The block memory 802(a) temporarily stores one-block quantized orthogonal transformation factors output from the Huffman decoder 801 and performs write/read operation in accordance with the addresses output from the selector 802(e). In consideration of processing speed, as the scan sequences set in the address generator 1 802(b), address generator 2 802(c), and address generator 3 802(d), the scan sequences shown in FIGS. 2B, 2C, 2D, and 2E and the like are advantageous. FIG. 2E shows a raster scan longitudinal sequence. However, the raster scan sequence may be used.

Assume that disproportionally many significant factors are distributed in the upper half part, as in the case of the quantization result arrangement example shown in FIG. 10A. In this case, if scanning is performed in the scan sequences shown in FIGS. 2A to 2E, the numbers of pairs of (S, S) are 6, 3, 1, 5, and 6, respectively. If, therefore, write/read operation is performed in the scan sequence shown in FIG. 2C, the number of pairs of (S, S) becomes small. Assume that disproportionally many significant factors are distributed in the left half, as in the case of the quantization result arrangement example shown in FIG. 11A. In this case, if scanning is performed in the scan sequences shown in FIGS. 2A to 2E, the numbers of pairs of (S, S) are 5, 2, 4, 1, and 6, respectively. If, therefore, write/read operation is performed in the scan sequence shown in FIG. 2D, the number of pairs of (S, S) becomes small. As described above, a scan sequence that is advantageous in terms of processing speed is selected on the basis of the significant factor distribution information of each processing target block.

A quantization threshold table 804 outputs, in twos, quantization thresholds corresponding to the quantized orthogonal transformation factors output in twos from the first scan converter 802. A 0 determination unit 803 receives the two quantized orthogonal transformation factors output from the first scan converter 802, determines whether each of the input quantized orthogonal transformation factors is 0, and outputs the determination result to a controller 805.

The controller 805 outputs control signals in accordance with the output results from the 0 determination unit 803. More specifically, if at least one of the two quantized orthogonal transformation factors output from the first scan converter 802 is 0, the controller 805 outputs control signals to selectors 806 and 807 to select the factor which is not 0 (if the two factors are 0, outputting control signals for selecting any factor exerts no influence on operation). If neither of the factors is 0, the controller 805 outputs control signals to the selectors to alternately select the factors one by one in two cycles in accordance with the scan sequence of factors converted by the first scan converter 802. In addition, the controller 805 outputs a format signal to a second scan converter 809 in accordance with the output results from the 0 determination unit 803. The format signal includes information indicating "a pair of 0 and significant factor" if one of the two quantized orthogonal transformation factors output from the first scan converter 802 is 0, "a pair of 0 and 0" if the two factors are 0, or "only one significant factor" if the two factors are significant factors (if the two factors are significant factors, since the factors are inversely quantized one by one in two cycles, information indicating "only one significant factor" is consecutively output in two cycles), and information indicating, if the two factors are "a pair of 0 and significant factor", which of the pair of 0 and significant factor comes first in the scan sequence of factors converted by the first scan converter 802.

As described above, if a quantized orthogonal transformation factor is 0, a result can be obtained (i.e., 0) without any inverse quantization computation processing. If, therefore, at least one of two quantized orthogonal transformation factors is 0, control is performed to inversely quantize the two orthogonal transformation factors substantially in one cycle.

The selector 806 selects one of the two quantized orthogonal transformation factors output from the first scan converter 802 in accordance with the control signal output from the controller 805, and outputs the selected factor to an inverse quantization computation unit 808. The selector 807 selects one of the two quantization thresholds output from the quantization threshold table 804 in accordance with the control signal output from the controller 805, and outputs the selected threshold to the inverse quantization computation unit 808. The quantization threshold output from the selector 807 becomes a quantization threshold that always corresponds to the quantized orthogonal transformation factor output from the selector 806.

The inverse quantization computation unit 808 outputs, to the second scan converter 809, the inverse quantization results obtained by multiplying outputs from the selector 806 by outputs from the selector 807.

The second scan converter 809 selects a scan sequence corresponding to the scan sequence selected by the first scan converter 802 on the basis of a sequence selection signal, rearranges outputs from the inverse quantization computation unit 808 in accordance with the selected scan sequence, and outputs the factors in twos to an inverse orthogonal transformer 810. The second scan converter 809 is comprised of a block memory 809(a), an address generator 4 809(b), an address generator 5 809(c), an address generator 6 809(d), and a selector 809(e) for selecting one of outputs from the address generator 4 809(b), address generator 5 809(c), and block memory 6 809(d) in accordance with a sequence selection signal. The block memory 809(a) temporarily stores one-block outputs from the inverse quantization computation unit 808, and performs write/read operation in accordance with the addresses output from the selector 809(e). The inverse orthogonal transformer 810 sequentially performs inverse orthogonal transformation processing for outputs from the second scan converter 809.

FIG. 9A shows an example in which orthogonal transformation and quantization are performed for an image segmented into blocks each constituted by 8×8 pixels. Referring to FIG. 9A, "S" indicates a significant factor, and "0" indicates an insignificant factor.

It is generally known that power concentrates on DC components and low-frequency components in many images upon orthogonal transformation. In addition, in many cases, large values are assigned to quantization thresholds corresponding to high-frequency components considering that the human visual characteristics are insensitive to high-frequency components. For this reason, as shown in FIG. 9A, significant factors tend to continuously concentrate on the upper left part of an orthogonal transformation block, i.e., an early part of the zigzag scan sequence. The quantization processing time can be minimized by using this characteristic and determining a scan sequence to disperse the significant factors as uniformly as possible.

In the example shown in FIG. 9A, the following are the numbers of cycles required for processing in the arrangement of the fourth embodiment of the present invention.

First of all, when the scan sequence shown in FIG. 2B is selected, and the factors in the quantization result arrangement example shown in FIG. 9A are arranged in twos, the arrangement shown in FIG. 9C is obtained. In this case, since there are two pairs of (S, S), the quantization processing time for 64 factors is 2×2+(32−2)=34 cycles.

Next, when the scan sequence shown in FIG. 2C is selected, and the factors in the quantization result arrangement example shown in FIG. 9A are arranged in twos, the arrangement shown in FIG. 9D is obtained. In this case, since there is one pair of (S, S), the quantization processing time for 64 factors is 1×2+(32−2)=33 cycles.

Next, when the scan sequence shown in FIG. 2D is selected, and the factors in the quantization result arrangement example shown in FIG. 9A are arranged in twos, the arrangement shown in FIG. 9E is obtained. In this case, since there are three pairs of (S, S), the quantization processing time for 64 factors is 3×2+(32−3)=35 cycles.

Next, when the scan sequence shown in FIG. 2E is selected, and the factors in the quantization result arrangement example shown in FIG. 9A are arranged in twos, the arrangement shown in FIG. 9F is obtained. In this case, since there are seven pairs of (S, S), the quantization processing time for 64 factors is 7×2+(32−7)=39 cycles.

The number of write cycles in the block memory 709(a) therefore becomes 33 cycles in the case shown in FIG. 2C. The number of read cycles with respect to the block memory 709(a) becomes 8×8÷2=32 cycles. Since no initialization cycle is required, the total number of processing cycles is 33+32=65 cycles at minimum.

In the example shown in FIG. 9A, with the conventional arrangement, the following is the number of cycles required for processing.

In the example shown in FIG. 9A, since the number of significant factors is 20, the total number of clock cycles required for processing for the processing target clock is 20 cycles for write processing, 32 cycles for read processing, and 20 cycles for initialization processing, i.e., a total of 72 cycles.

In the example shown in FIG. 9A, therefore, the processing time is shortened by about 10% of that required in the prior art. In addition, with the conventional arrangement, the number of processing cycles required per unit block of 8×8 pixels greatly varies from 32 to 160. For this reason, there is a large difference in the time required for decoding between coded data with a high compression ratio and coded data with low compression ratio. According to this embodiment having the arrangement of the present invention, the number of processing cycles required per unit block of 8×8 pixels varies a little from 64 to 96. Therefore, there is a little difference in the time required for decoding between coded data with a high compression ratio and coded data with a low compression ratio. This fact produces an effect when a system incorporating a decoder must match the processing speed required for the decoder with the worst value of the processing speed of the decoder, and also produces an effect when many coded image data processed by a system incorporating a decoder are data with a relatively low compression ratio.

As has been described above, decoding can be performed at high speed regardless of the compression ratio of an image by considering a scan sequence such that the significant factors of quantized orthogonal transformation factors input to the inverse quantization unit are dispersed as uniformly as possible, except for an initialization processing period of the block memory.

As described above, according to the present invention, by using a scan sequence which is set such that the significant factors of factors quantized or inversely quantized are dispersed as uniformly as possible, the number of processing cycles can be reduced as compared with processing based on the zigzag scan sequence, thereby realizing coding/decoding processing at high speed as a whole.

In addition, by preparing a plurality of scan sequences in advance and selectively using the scan sequences in accordance with a sequence selection signal, a scan sequence suitable for the distribution of input factors can be selected. This makes it possible to effectively reduce the number of processing cycles.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment/embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM-can be used for providing the program codes.

Furthermore, besides aforesaid functions according to the above embodiment/embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. An image coder which quantizes a predetermined number of orthogonal transformation factors, comprising:
   a first scan converter, adapted to rearrange the orthogonal transformation factors in a first scan sequence which is different from a zigzag scan sequence and output the predetermined number of the rearranged orthogonal transformation factors at a time; and
   a second scan converter, adapted to rearrange quantized orthogonal transformation factors in the zigzag scan sequence and output the rearranged quantized orthogonal transformation factors,
   wherein the first scan sequence is a sequence in which odd-numbered samples are arranged in a forward direction from a start of the zigzag scan sequence, and even-numbered samples are arranged in a reverse direction from an end of the zigzag scan sequence, in a scanning order of 8×8 DCT coefficients of 1 through 64.

2. An image coding method of quantizing a predetermined number of orthogonal transformation factors comprising:
   a first scan conversion step, of rearranging the orthogonal transformation factors in a first scan sequence which is different from a zigzag scan sequence and outputting the predetermined number of the rearranged orthogonal transformation factors at a time; and
   a second scan conversion step, of rearranging quantized orthogonal transformation factors in the zigzag scan sequence and outputting the rearranged quantized orthogonal transformation factors,
   wherein the first scan sequence is a sequence in which odd-numbered samples are arranged in a forward direction from a start of the zigzag scan sequence, and even-numbered samples are arranged in a reverse direction from an end of the zigzag scan sequence, in a scanning order of 8×8 DCT coefficients of 1 through 64.

3. A computer readable storage medium storing an image coding program for causing a computer to quantize a predetermined number of orthogonal transformation factors, comprising:
   code for a first scan conversion step, of rearranging the orthogonal transformation factors in a first scan sequence which is different from a zigzag scan sequence and outputting the predetermined number of the rearranged orthogonal transformation factors at a time; and
   code for a second scan conversion step, of rearranging quantized orthogonal transformation factors in the zigzag scan sequence and outputting the rearranged quantized orthogonal transformation factors,
   wherein the first scan sequence is a sequence in which odd-numbered samples are arranged in a forward direction from a start of the zigzag scan sequence, and even-numbered samples are arranged in a reverse direction from an end of the zigzag scan sequence, in a scanning order of 8×8 DCT coefficients of 1 through 64.

* * * * *

UNITED STATES PATENT AND TRADEMARK OFFICE
CERTIFICATE OF CORRECTION

| | | |
|---|---|---|
| PATENT NO. | : 7,218,788 B2 | |
| APPLICATION NO. | : 10/073112 | |
| DATED | : May 15, 2007 | |
| INVENTOR(S) | : Susumu Igarashi et al. | |

It is certified that error appears in the above-identified patent and that said Letters Patent is hereby corrected as shown below:

SHEET 1:

Line F1, "HAFFMAN CODER" should read --HUFFMAN CODER--.

COLUMN 1:

Line 8, "image" should read --image,-- and
    Line 38, "transformat ion" should read --transformation--.

COLUMN 3:

Line 49, "cessing 64 cycles," should be --cessing = 64 cycles,--.

COLUMN 4:

Line 36, "not less two" should read --not less than two--.

COLUMN 6:

Line 1, "In FIG. 9B" should read --FIG. 9B--.

COLUMN 14:

Line 51, "(S. S)," should read --(S, S),--.

COLUMN 21:

Line 35, "ROM-can" should read --ROM can--.

UNITED STATES PATENT AND TRADEMARK OFFICE
CERTIFICATE OF CORRECTION

PATENT NO. : 7,218,788 B2
APPLICATION NO. : 10/073112
DATED : May 15, 2007
INVENTOR(S) : Susumu Igarashi et al.

It is certified that error appears in the above-identified patent and that said Letters Patent is hereby corrected as shown below:

COLUMN 22:

Line 58, "1 through 64" should read --1 through 64.--; and
Line 59, "." should be deleted.

Signed and Sealed this

Sixteenth Day of September, 2008

JON W. DUDAS
*Director of the United States Patent and Trademark Office*